(12) United States Patent
Toda et al.

(10) Patent No.: US 7,046,018 B2
(45) Date of Patent: May 16, 2006

(54) POSITION SENSOR

(75) Inventors: Seiji Toda, Nagaokakyo (JP); Naomasa Oshie, Moriyama (JP)

(73) Assignee: Levex Corporation, Kyoto (JP)

( * ) Notice: Subject to any disclaimer, the term of this patent is extended or adjusted under 35 U.S.C. 154(b) by 137 days.

(21) Appl. No.: 10/414,755

(22) Filed: Apr. 16, 2003

(65) Prior Publication Data

US 2003/0179003 A1 Sep. 25, 2003

Related U.S. Application Data

(63) Continuation of application No. PCT/JP02/03798, filed on Apr. 17, 2002.

(30) Foreign Application Priority Data

Apr. 23, 2001 (JP) ......................................... 2001-163441
Mar. 12, 2002 (JP) ......................................... 2002-066597

(51) Int. Cl.
*G01B 7/14* (2006.01)
*G01R 27/26* (2006.01)

(52) U.S. Cl. .............. 324/679; 324/207.11; 324/207.24

(58) Field of Classification Search ................. 324/660, 324/678, 679, 207.12, 207.13, 207.14, 207.22, 324/207.25, 207.15, 207.16, 654, 207.11, 324/207.24, 207.18, 207.19
See application file for complete search history.

(56) References Cited

U.S. PATENT DOCUMENTS

| | | | |
|---|---|---|---|
| 3,727,128 A | | 4/1973 | McFerrin |
| 3,870,953 A | * | 3/1975 | Boatman et al. ........... 324/72.5 |
| 4,005,363 A | | 1/1977 | Mifflin |
| 4,165,482 A | | 8/1979 | Gale |
| 4,176,339 A | | 11/1979 | Konrad |
| 4,310,807 A | | 1/1982 | McKee ........................ 331/65 |
| 4,853,950 A | | 8/1989 | Crane |

(Continued)

FOREIGN PATENT DOCUMENTS

| | | |
|---|---|---|
| EP | 0 030 997 | 7/1981 |
| JP | 2001-330408 | * 11/2001 |

OTHER PUBLICATIONS

Jong et al., Time–Domain Characterization of Interconnect Discontinuities in High–Speed Circuits, IEEE Transaction on Components 1992.
Burkhart et al., Arbitrary Pulse Shape Synthesis via Non-uniform Transmission Lines, IEEE Transaction on Microwaves 1990.

*Primary Examiner*—Anjan Deb
*Assistant Examiner*—Jeff Natalini
(74) *Attorney, Agent, or Firm*—Jordan & Hamburg LLP

(57) ABSTRACT

A position sensor is provided comprising a coil (1) and an electric conductor (2) or magnetic (3) both arranged so that the size of their overlapping area (p) is varied as the position of an object to be examined changes, a resistor (6), a capacitor (4), a comparator (5) of an inverse output type, and a timing circuit (50a) arranged for uniformly restraining the period (T) of a continuous oscillating motion, herein a displacement of the object to be examined is detected as a change in the time duration (t) which extends from the leading end of the period (T) to a time when the output of the comparator (5) is turned to a high level as timed with substantially the trailing end of the period (T). The resistance of the resistor (6) is determined so that a change in the time duration (t) remains minimum when the resistance of the resistor (6) is varied and when the temperature is at a predetermined degree. As the result, the linearity of the output can be improved over variation of both the temperature and the position.

14 Claims, 18 Drawing Sheets

U.S. PATENT DOCUMENTS

| | | |
|---|---|---|
| 5,083,086 A | 1/1992 | Steiner |
| 5,352,994 A | 10/1994 | Black et al. |
| 5,600,248 A | 2/1997 | Westrom et al. |
| 5,748,002 A | 5/1998 | Scott et al. |
| 5,841,273 A * | 11/1998 | Muraji .................. 324/207.17 |
| 6,137,293 A | 10/2000 | Wu et al. |
| 6,268,721 B1 * | 7/2001 | Schroeder et al. ..... 324/207.25 |
| 6,307,380 B1 * | 10/2001 | Hirai et al. ................. 324/533 |

* cited by examiner (a)  (b)

(a)  (b)

(a)　　　　　　　(b)

(a)　　　　　　　(b)

POSITION SENSOR

REFERENCE TO RELATED PATENT APPLICATIONS

This application is a continuation of PCT No. PCT/JP02/03798, filed Apr. 17, 2002, hereby incorporated by reference. In addition, this application claims the benefit of Japanese Application No. 2002-066597 filed Mar. 12, 2002 as well as Japanese Application No. 2001-163441 filed Apr. 23, 2001, both incorporated by reference.

FIELD OF THE INVENTION

The present invention relates to a position sensor and more specifically to a position sensor which is improved in the temperature properties and in the linearity of its output to a displacement to be measured.

BACKGROUND OF THE INVENTION

A conventional position sensor is known comprising a coil and a magnetic member both arranged so that the size of the their overlapping area is varied as the position of an object to be examined changes, a resistor connected in series with the coil, a capacitor arranged to be charged and discharged through a series circuit of the coil and the resistor, and a comparator arranged of an inverse output type for receiving the charging voltage of the capacitor as an input and when the output is at a high level, conducting charging of the capacitor and when the output is at a low level, conducting discharging of the capacitor wherein a displacement of the object is detected as a change in the period T of a continuous oscillating motion.

Such a conventional position sensor however has a disadvantage that the period T remains not uniform due to temperature related variations including a change in the resistance of the coil thus deteriorating the temperature properties.

Also, as the period T in the conventional position sensor is varied inverse proportional to the displacement of the object to be examined, hence declining the linearity of the output.

It is thus an object of the present invention to provide a position sensor which is improved in the temperature properties and a position sensor of which the output representing a displacement is improved in the linearity.

SUMMARY OF THE INVENTION

As a first feature of the present invention, a position sensor is provided comprising a coil 1 and an electric conductor 2 or magnetic member 3 both arranged so that the size of their overlapping area p is varied as the position of an object to be examined changes, a resistor 6 connected in series with the coil 1, a capacitor 4 arranged to be charged and discharged through a series circuit of the coil 1 and the resistor 6, and a comparator 5 arranged of an inverse output type for receiving the charging voltage of the capacitor 4 as an input and when the output is at a high level, conducting charging of the capacitor 4 and when the output is at a low level, conducting discharging of the capacitor 4, wherein a displacement of an object to be examined is detected as a change in the period T of a continuous oscillating motion. In particular, the position sensor 100 is characterized in that the resistance of the coil 1, the resistance of the resistor 6, the capacitance of the capacitor 4, and the threshold of the comparator 5 are determined so that a change in the period T remains minimum when at least one of the resistance of the coil 1, the resistance of the resistor 6, the capacitance of the capacitor 4, and the threshold of the comparator 5 is varied and when the temperature is at a predetermined degree.

The period T depends on the time constant for charging and discharging of the capacitor 4 and will presumably be increased when the resistance of the resistor 6 or the coil 1 increases. It was however found through a series of experiments conducted by the inventors that, under certain condition, the period T became short as the resistance increased from 0 Ω. The period T was measured shortest at a point and then became long. The reason why the period T becomes shortest at the point is not ascertained but may closely be related with same factors including the oscillation of the voltage by the effect of back electromotive force on the coil 1 and the phase and overshoot of charging and discharging currents.

It is thus adjusted in the position sensor 100 of the first feature that the resistance of the coil 1, the resistance of the resistor 6, the capacitance of the capacitor 4, and the threshold of the comparator 5 are determined so that the period T is varied minimum within a range of operating temperature even when at least one of the resistance of the coil 1, the resistance of the resistor 6, the capacitance of the capacitor 4, and the threshold of the comparator 5 changes. This permits a change in the period T to be minimized when the operating temperature is significantly shifted across the predetermined degree (e.g. 25° C.) within the temperature range (e.g. from −25° C. to 75° C.).

When the coil 1 is inserted into the electric conductor 2, its inducing magnetic flux may produce an eddy current on the electric conductor 2 which leads to energy loss and will decline the inductance of the coil 1.

Alternatively, when the coil 1 is inserted into the magnetic member 3, its inducing magnetic flux can be concentrated by the action of the magnetic member 3 thus increasing the inductance of the coil 1.

Depending on the use of either the electric conductor 2 or the magnetic member 3, the coil 1 can be characterized whether its inductance is increased or decreased.

When the coil 1 is of a non-cored type and the electric conductor 2 is non-magnetic, the effect of ambient direct-current magnetization will be minimized thus decreasing the overall size of the coil 1 while the effect of alternating-current magnetic field is hardly involved.

Also, as the coil 1 is fed with a pulse form of voltage, its output can satisfactorily be high even if its inductance is low. Accordingly, the overall size of the coil 1 can be decreased.

As a second feature of the present invention, a position sensor is provided comprising a con 1 and an electric conductor 2 or magnetic member 3 both arranged so that the size of their overlapping area p is varied as the position of an object to be examined changes, a resistor 6 connected in series with the coil 1, a capacitor 4 arranged to be charged and discharged through a series circuit of the coil 1 and the resistor 6, a comparator 5 arranged of an inverse output type for receiving the charging voltage of the capacitor 4 as an input, and a timing circuit 50a or 50b for uniformly restricting the period T of a continuous oscillating motion. The position sensor 200a or 200b of this embodiment is characterized in that a displacement of the object to be examined is detected as a change in the time duration t which extends from the leading end of the period T to a moment when the output of the comparator 5 is turned back to the high level as timed with substantially the trailing end of the period T.

The inductance L of the coil 1 is varied proportional to a change in the size of the overlapping area or a displacement of the object to be examined. However, the period T is varied inverse proportional to $1/\sqrt{L}$. More specifically, the period T of the continuous oscillating motion is inverse proportional to the displacement of the object to be examined thus declining the linearity.

The position sensor 200a or 200b of the second feature is designed in which the displacement of the object is detected as a change in the time duration t which extends from the leading end of the period T to a moment when the output of the comparator 5 is turned back to the high level as timed with substantially the trailing end of the period T. As win be described later in more detail, the time duration t is proportional to the displacement of the object to be examined. Since the period T of the continuous oscillating motion is made uniform by the timing circuit 50a or 50b, the effective value of the time duration or pulse width t in a square wave signal can be proportional to the displacement of the object to be examined thus improving the linearity.

As a third feature of the present invention, the position sensor 200a or 200b is modified in which the resistance of the coil 1, the resistance of the resistor 6, the capacitance of the capacitor 4, and the threshold of the comparator 5 are determined so that a change in the time duration t remains minimum when at least one of the resistance of the coil 1, the resistance of the resistor 6, the capacitance of the capacitor 4, and the threshold of the comparator 5 is varied and when the temperature is at a predetermined degree.

The time duration t depends on the time constant for charging and discharging of the capacitor 4 and becomes longer when the resistance of the coil 1 or the resistor 6 increases. It was however found through a series of experiments conducted by the inventors that, under certain condition, the time duration became short as the resistance increased from 0 Ω. The time duration t was measured shortest at a point and then became long. The reason why the time duration t becomes shortest at the point is not ascertained but may closely be related with same factors including the oscillation of the voltage by the effect of back electromotive force on the coil 1 and the phase and overshoot of charging and discharging currents.

It is thus adjusted in the position sensor 200a or 200b of the third feature that the resistance of the coil 1, the resistance of the resistor 6, the capacitance of the capacitor 4, and the threshold of the comparator 5 are determined so that the time duration t is varied minimum within a range of operating temperature even when at least one of the resistance of the coil 1, the resistance of the resistor 6, the capacitance of the capacitor 4, and the threshold of the comparator 5 changes. This permits a change in the time duration t to be minimized when the operating temperature is significantly shifted across the predetermined degree (e.g. 25° C.) within the temperature range (e.g. from −25° C. to 75° C.).

As a fourth feature of the present invention, the position sensor is modified in which the threshold of the comparator 5 is featured with hysteresis, thus ensuring the stable action of oscillation.

As a fifth feature of the present invention, a position sensor is provided comprising a coil 1 and an electric conductor 2 or magnetic member 3 both arranged so that the size of their overlapping area p is varied as the position of an object to be examined changes, a resistor 6 connected in series with the coil 1, a capacitor 4 arranged to be charged and discharged through a series circuit of the coil 1 and the resistor 6, a comparator 5 arranged of an inverse output type for receiving the charging voltage of the capacitor 4 as an input and of which is featured with hysteresis, and a timing circuit 50a for uniformly restricting the period T of a continuous oscillating motion. Particularly, the position sensor 200c or 200d of this feature is characterized in that a displacement of the object to be examined is detected as a change in the time duration t' for charging the capacitor 4 or the time duration t" for discharging the capacitor 4.

The inductance L of the coil 1 is varied proportional to a change in the size of the overlapping area or a displacement of the object to be examined. The period T of the continuous oscillating motion is proportional to $1/\sqrt{L}$. More specifically, the period T of the continuous oscillating motion is inverse proportional to the displacement of the object to be examined, thus being unfavorable in the linearity.

The position sensor 200c or 200d of the fifth feature allows a change in the time duration t' for charging the capacitor 4 or in the time duration t" for discharging the capacitor 4 to be measured as the displacement of the object to be examined. As will be described later in more detail, the time duration t is proportional to the displacement of the object. As the period T of the continuous oscillating motion is uniformly controlled by the timing circuit 50a, the effect value of the time duration t' or t" in a square wave becomes proportional to the displacement of the object, thus improving the linearity.

As a sixth feature of the present invention, the position sensor is modified in which the object to be examined is accompanied with the coil 1 or the electric conductor 2 or magnetic member 3 so that the size of its overlapping area at either the outer or inner side of the coil 1 is varied as the object travels linearly.

The position sensor of the sixth feature allows a cored coil to be employed as the coil 1 when the size of the overlapping area is measured at the outer side. Alternatively, a non-cored coil can be used as the coil 1 when the size of the overlapping area is measured at the inner side.

As a seventh feature of the present invention, the position sensor is modified in which the object to be examined is accompanied with the coil 1 or the electric conductor 2 or magnetic member 3 so that the size of its overlapping area at both the outer and inner sides of the coil 1 is varied as the object travels linearly.

The position sensor of the seventh feature can produce a greater level of the output.

As an eighth feature of the present invention, the position sensor is modified in which the object to be examined is a rotary shaft 14 on which an electric conductor 15 or magnetic member 16 of a gradual radial diverging disc shape is mounted and a coil 17 is located so that the size of its overlapping area is varied as the rotary shaft 14 rotates.

The position sensor of the eighth feature can favorably measure the angular position in a rotating direction of the rotary shaft 14.

As a ninth feature of the present invention, the position sensor is modified in which the object to be examined is a rotary shaft 14 on which an electric conductor 15 or magnetic member 16 of a gradual radial diverging disc shape is mounted and a pair of coils 17 is located to sandwich the gradual radial diverging disc so that the size of its overlapping area is varied as the rotary shaft 14 rotates.

The position sensor of the ninth feature allows the disc of the electric conductor 15 or magnetic member 16 to be sandwiched between the paired coils 17 thus offsetting the effect of axial dislocation of the rotary shaft 14 caused by a thrust force. Accordingly, a change in the output can be minimized.

As a tenth feature of the present invention, the position sensor is modified in which the object to be examined is a rotary shaft 14 on which a pair of electric conductors 15 or magnetic m 16 of a gradual radial diverging disc shape are mounted at a distance from and in phase with each other and a coil 17 is located between the paired discs so that the size of its overlapping area is varied as the rotary shaft 14 rotates.

The position sensor of the tenth feature allows the coil 17 to be sandwiched between the pared electric conductors 15 or magnetic member 16 thus offsetting the effect of axial dislocation of the rotary shaft 14 caused by a thrust force. Accordingly, a change in the output can be minimized.

As an eleventh feature of the present invention, the position sensor is modified in which the object to be examined is a rotary shaft 14 on which an electric conductor 15 or magnetic m 16 of a gradual radial diverging disc shape symmetrical about the center point is mounted and a pair of coils 17 are located symmetrical about the center point so that the size of their overlapping area is varied as the rotary shaft 14 rotates.

The position sensor of the eleventh feature allows the two coils 17 to be arranged symmetrical about the axis of the rotary shaft 14 thus offsetting the effect of radial dislocation of the rotary shaft 14 caused by a radial force. Accordingly, a change in the output can be minimized.

As a twelfth feature of the present invention, the position sensor is modified in which the object to be examined is a rotary shaft 14 on which an electric conductor 15 or magnetic members 16 of a gradual radial diverging disc shape symmetrical about the center point is mounted and two pairs of coils 17 are located symmetrical about the center point to sandwich the disk between each pair so that the size of their overlapping area is varied as the rotary shaft 14 rotates.

The position sensor of the twelfth feature allows the disc of the electric conductor 15 or magnetic member 16 to be sandwiched between each pair of the coils 17 thus offsetting both the effect of axial dislocation of the rotary shaft 14 caused by a thrust force and the effect of radial dislocation of the rotary shaft 14 caused by a radial force. Accordingly, a change in the output can further be minimized.

As a thirteenth feature of the present invention, the position sensor is modified in which the object to be examined is a rotary shaft 14 on which a pair of electric conductors 15 or magnetic members 16 of a gradual radial diverging disc shape symmetrical about the center point are mounted at a distance from and in phase with each other and a pair of coils 17 are located between the paired discs so that the size of their overlapping area is varied as the rotary shaft 14 rotates.

The position sensor of the thirteenth feature allows each coil 17 to be sandwiched between the two electric conductors 15 or magnetic members 16 thus offsetting both the effect of axial dislocation of the rotary shaft 14 caused by a thrust force and the effect of radial dislocation of the rotary shaft 14 caused by a radial force. Accordingly, a change in the output can further be minimized.

As a fourteenth feature of the present invention, the position sensor is modified in which the coil 1 is of a core type having a magnetic core provided in the center thereof.

The position sensor of the fourteenth feature allows the coil 11 of a core type to have a magnetic core provided in the center thereof and thus be increased in the inductance even when its dimensions are limited. Also, the coil 11 can be installed in a wall-thickened pressure vessel made of stainless steel or the like.

BRIEF DESCRIPTIONS OF THE DRAWINGS

BEST MODES FOR EMBODYING THE INVENTION

The present invention will be described in more detail referring to some embodiments shown in the relevant drawings. It would be understood that the present invention is not limited to the embodiments.

(First Embodiment)

Figure 1:
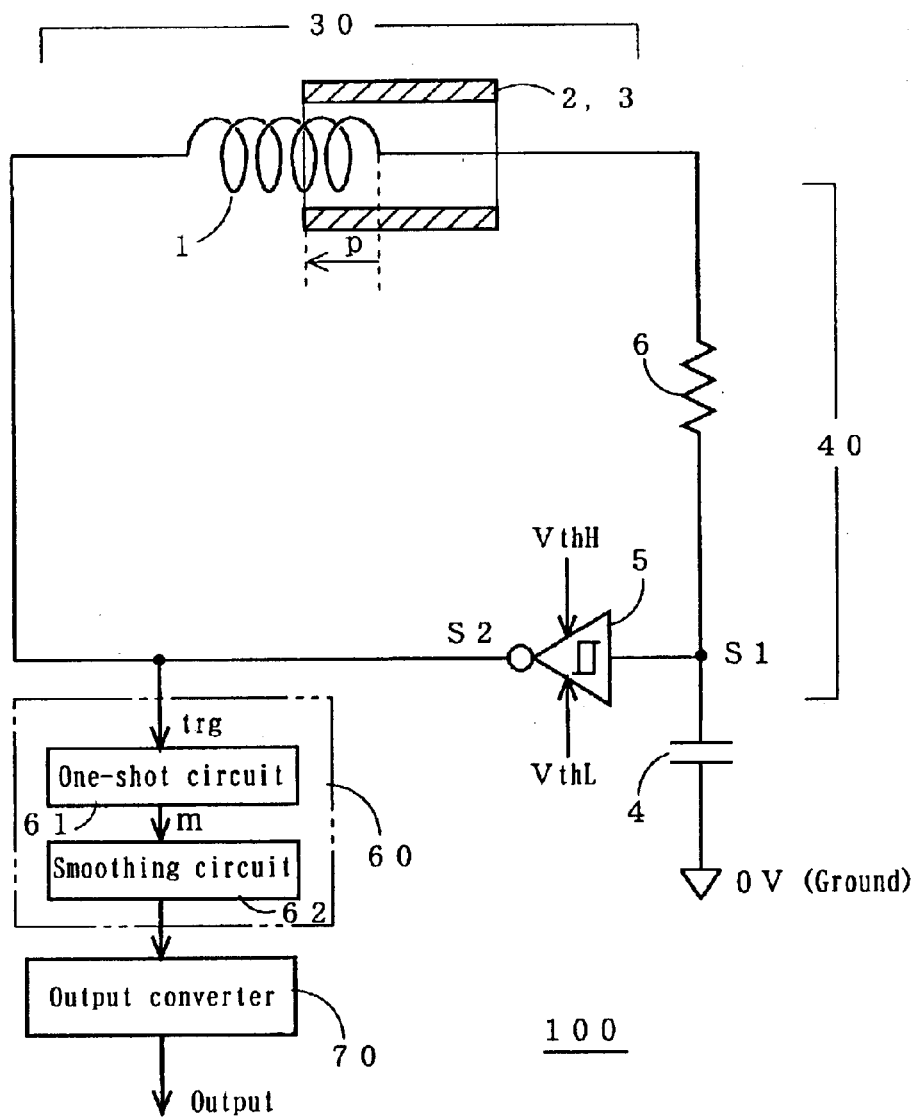
FIG. 1 is a schematic view of a position sensor according to a first embodiment of the present invention.

FIG. 1 is a schematic view of a position sensor 100 showing a first embodiment of the present intention.

The position sensor 100 comprises a displacement detector 30, a pulse output module 40, a voltage converter 60, and an output converter 70.

The displacement detector 30 comprises a coil 1 and an electric conductor 2 or a magnetic member 3.

The electric conductor 2 or magnetic member 3 is located relative to the coil 1 so that its overlapping length p with the coil 1 is varied depending on a positional displacement of the object to be examined.

The coil 1 may be a four-layer roll of 0.071-mm enamel coated copper wire which is 2.3 mm in inner diameter and 22 m in length and has 1240 turns. The coil 1 may be accommodated in a stainless steel protective tube which is 3 mm in inner diameter and 3.8 mm in outer diameter.

The electric conductor 2 or magnetic member 3 may be made of an aluminum tube which is 4.5 mm in inner diameter and 6.5 mm in outer diameter.

The pulse output module 40 comprises a capacitor 4, a comparator 5, and a resistor 6. The capacitor 4 may be of 15000 pF type. The resistor 6 may be of 60 Ω type.

The capacitor 4 is connected at one end to an input port of the comparator 5 and at the other end to a 0 V source or the ground. The resistor 6 is connected in series with the displacement detector 30. The series circuit of the resistor 6 and the displacement detector 30 is connected at one end to the input port of the comparator 5 and at the other end to an output port of the comparator 5.

The comparator 5 is of an inverted output type for releasing a high level output when the input voltage S1 is increasing and remains not higher than an upper threshold VthH and a low level output when the input voltage S1 exceeds the upper threshold VthH. Alternatively, it releases a low level output when the input voltage S1 is decreasing and remains not lower than a lower threshold VthL and a high level output when the input voltage S1 drops down from the lower threshold VthL.

The voltage converter 60 comprises a one-shot circuit 61 for producing a square wave m of a pulse width t when triggered at the timing of rise and decay of the output voltage S2 from the comparator 5 and a smoothing circuit 62 for producing a voltage output which is proportional to the area defined by the unit tame of the t pulse-width square wave m. This arrangement is well known as a frequency-to-voltage converter circuit.

The output converter 70 is designed for releasing a voltage or current corresponding to the output voltage from the voltage converter 60 or examining whether the output voltage from m the voltage converter 60 is lower or higher than a predetermined threshold to produce a switching output.

The action of the position sensor 100 will now be described in more detail.

Figure 2:
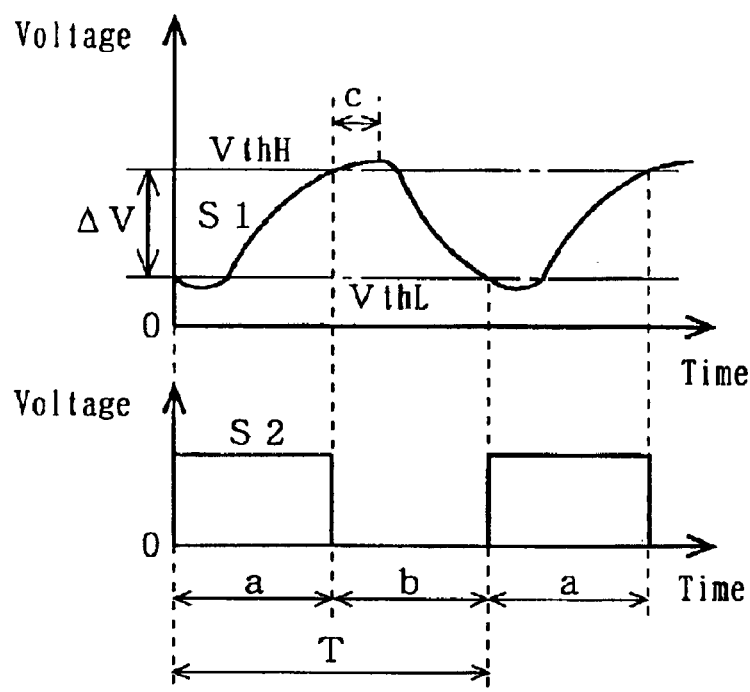
FIG. 2 is a waveform diagram showing the input voltage and the output voltage of a comparator in the position sensor of the first embodiment.

As denoted by the time interval a in FIG. 2, the capacitor 4 is charged from the output port of the comparator 5 at a time constant determined by a combination of the coil 1, the resistor 6, and the capacitor 4 when the output voltage S2 from the comparator 5 is at the high level. More particularly, the input voltage S1 of the comparator 5 is increasing from the lower voltage.

Before the input voltage S1 of the comparator 5 reaches the upper threshold VthH, the output voltage S2 from the comparator 5 is held at the high level.

As denoted by the time interval b in FIG. 2, the output voltage S2 from the comparator 5 is turned back to the low level (0 V or the ground level) when the input voltage S1 of the comparator 5 exceeds the upper threshold VthH. The capacitor 4 is then discharged to the output port of the comparator 5 at a time constant determined by a combination of the coil 1, the resistor 6, and the capacitor 4 when the output voltage S2 from the comparator 5 is at the low level.

Before the input voltage S1 of the comparator 5 reaches the lower threshold VthL, the output voltage S2 from the comparator 5 is held at the low level.

As denoted by the time interval c in FIG. 2, the input voltage S1 of the comparator 5 is not declined immediately after the output voltage S2 from the comparator 5 is turned back to the low level but first overshot and then lowered.

When the input voltage S1 of the comparator 5 is lower than the lower threshold VthL, the output voltage S2 from the comparator 5 is turned back to the high level and the action returns to the above steps. Through repeating those steps, the oscillation can continuously be performed.

It is now assumed that the two thresholds VthH and VthL in the comparator 5 are characterized with hysteresis as the upper threshold VthH> the lower threshold VthL. The oscillation can hence be conducted at steadiness when the voltage difference ΔV shown in FIG. 2 is maintained at a sufficient level.

The oscillation may successfully be conducted by overshooting the output with the help of an back electromotive force on the coil 1 even if the two thresholds VthH and VthL in the comparator 5 are not characterized with hysteresis as VthH=VthL.

The inductance of the coil 1 in the displacement detector 30 can be varied depending on the displacement of the object to be examined as the overlapping length p between the coil 1 and the electric conductor 2 or magnetic member 3 changes.

Figure 3:
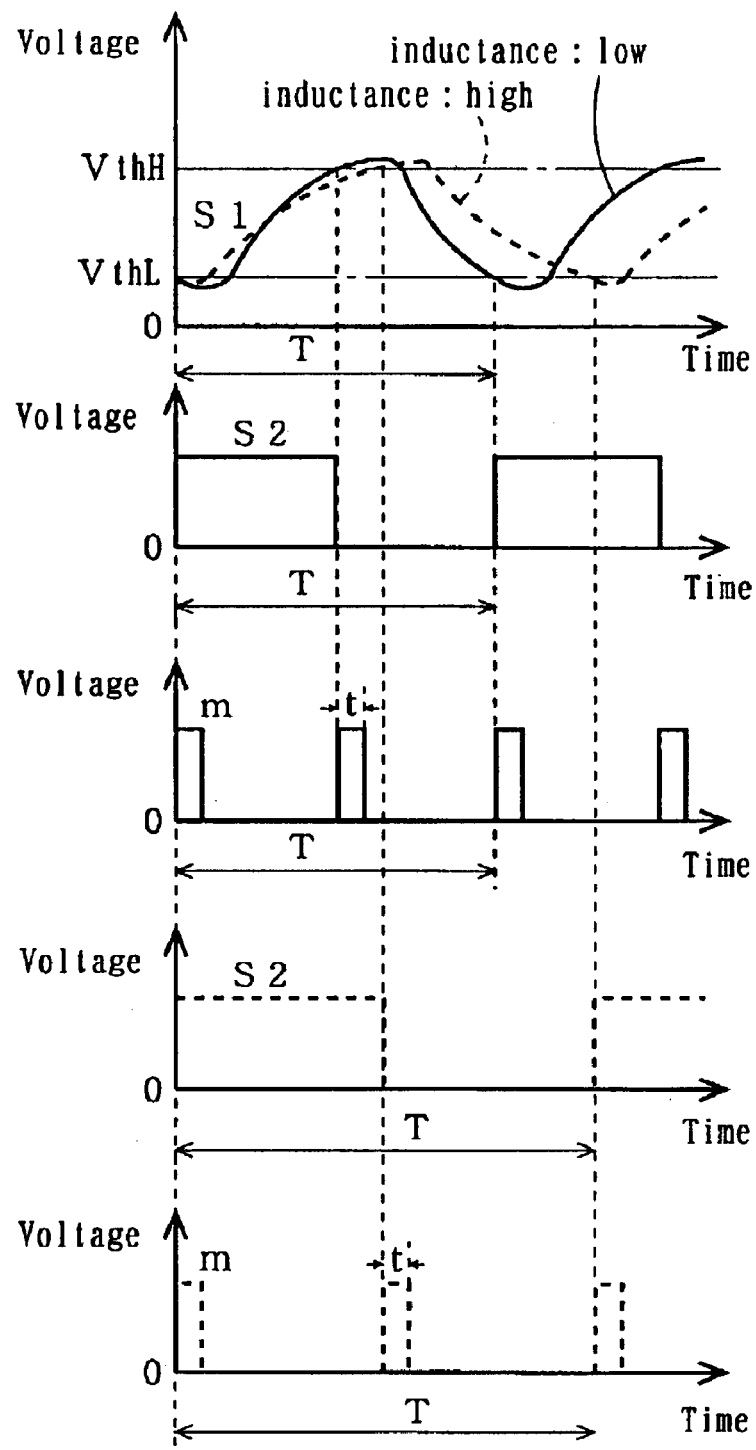
FIG. 3 is a waveform diagram of the waveform of comparative signals classified by the value of inductance in tile position sensor of the first embodiment.

The period T of the signal is decreased when the inductance of the coil 1 is low as denoted by the real line in FIG. 3. However, the period T of the signal is increased when the inductance of the coil 1 is high as denoted by the dotted line in FIG. 3.

As shown in FIG. 3, the one-shot circuit 61 in the voltage converter 60 is timed with the rise and decay of the output voltage S2 from the comparator 5 to generate the square wave m of the pulse width t.

The smoothing circuit 62 in the voltage converter 60 outputs an effective value of the square wave m and releases it as the output voltage.

When the inductance of the coil 1 is low and the period T of the signal is short as denoted by the real line in FIG. 3, the square wave m of the pulse width t can be increased in the frequency of generation per unit time thus boosting the output voltage.

On the contrary, when the inductance of the coil 1 is high and the period T of the signal is long as denoted by the dotted Line in FIG. 3, the square wave m of the pulse width t can be decreased in the frequency of generation per unit time thus declining the output voltage.

Accordingly, its output can be a detection signal indicating the location of the object to be examined when the output converter 70 produces a level of voltage or current which corresponds to the output voltage from the voltage converter 60.

Also, it is examined whether the output voltage from the voltage converter 60 is lower or higher than the threshold to generate the switching output which can be a judgment signal indicating that the object to be examined is located a particular side of the threshold point.

Figure 4:
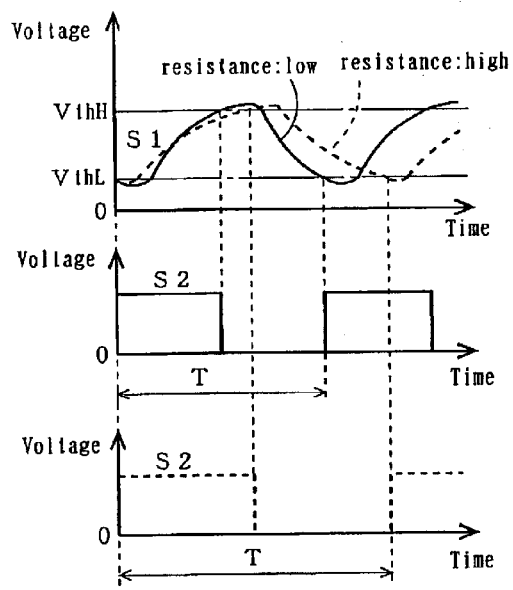
FIG. 4 is a waveform diagram of the waveform of comparative signals classified by the value of resistance in the position sensor of the first embodiment.

FIG. 4 is a waveform diagram when the resistance of the resistor 6 is varied with the thresholds VthH and VthL of the comparator 5 and the resistance of the coil 1 and the capacitor 4 remaining unchanged.

The waveform denoted by the real line is when the resistance of the resistor 6 is low while the waveform denoted by the dotted line is when the resistance is high. The higher the resistance of the resistor 6, the longer the period T of the waveform will be increased.

Accordingly, when the resistance of the resistor 6 or the coil 1 is varied due to temperature change, the period T will be unstable thus making a position detection error. It is hence necessary to compensate the temperature.

The period T depends upon the time constant for charging and discharging of the capacitor 4 and will presumably be increased when the resistance of the resistor 6 or the coil 1 increases. More specifically, it presumably has a characteristic curve shown in FIG. 5a.

Figure 5:
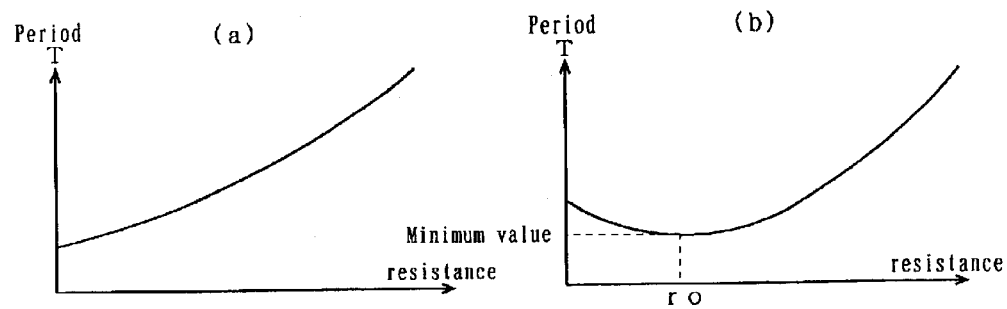
FIG. 5 is a graphic diagram showing the relationship between the period T and the resistance of a resistor in the position sensor of the first embodiment.

It is however found through a series of experiments conducted by the inventors that the period T is denoted not only as the characteristic curve in FIG. 5a but also as that in FIG. 5b. It was measured that under a certain condition, the period T became decreasing as the resistance increased from 0 Ω and the period T reached the minimum value and then became increasing.

The reason why the period T becomes shortest at the point is not ascertained but may closely be related with some factors including the oscillation of the voltage by the effect of back electromotive force on the coil 1 and the phase of charging and discharging currents. Additionally, the event may result from an overshoot denoted by c in FIG. 2.

It is thus ajusted in the position sensor 100 that a sum of the resistance of the coil 1 and the resistance of the resistor 6 within an operating range of the temperature is set to or about a specific level ro shown in FIG. 5b.

This permits a change in the period T to r minimum when the coil 1 is varied in the temperature and thus in the resistance.

The reason why the sun of the resistance is set to or about the specific level rm is now explained. As the coil 1 is varied in the temperature, its static capacitance or shape as well as its resistance may change. It is hence true that the specific level ro of the resistance is hardly ideal for the temperature compensation. It is however proved that the resistance is one of the major causes for varying the period T and its optimum level for the temperature compensation rarely deviates far from ro.

The measurement was carried out with the position sensor 100 which included the coil 1 of 3 mm in outer diameter and the electric conductor 2 made of an aluminum tube and of which the measuring distance (the m of p) was 50 mm. With the temperature of the coil 1 varying from 25° C. to 75° C., the rate of changed value per 1° C. to the full scale change was from 30 ppm to 50 ppm. The order of 30 ppm is substantially equivalent to the thermal expansion factor of the coil 1 or the aluminum tube and the measurement below 30 ppm will be impractical.

The advantages of the position sensor 100 of the first embodiment are:

that its dimensions can be minimized because two traditional coils of magnetizing type and differential type are replaced by the single coil 1 and its use will be favorable in a small sized system or at a limited installation area, that its output voltage is inverse proportional to the displacement to be measured, and that the temperature compensation can be done with no use of two traditional coils of differential type and temperature change will rarely give any influence to the displacement to be measured.

While the temperature compensation in this embodiment is carried out through adjusting the sum of the resistance of the coil 1 and the resistance of the resistor 6, it may be implemented by determining the capacitance of the capacitor 4 and the thresholds VthH and VthL of the comparator 5. The capacitance of the capacitor 4 and the thresholds VthH and VthL of the comparator 5 can be determined by checking the relationship between the period T and such values as the capacitance and the threshold voltages and finding the values which make the period T minimum at a desired range of the temperature. It is however easy and practical in the actual operation to control the resistance of the resistor 6 with the other conditions remaining fixed.

(Second Embodiment)

A second embodiment of the present invention is arranged to produce an output voltage which is proportional to the displacement. As described, the output voltage in the first embodiment is inverse proportional to the displacement.

Figure 6:
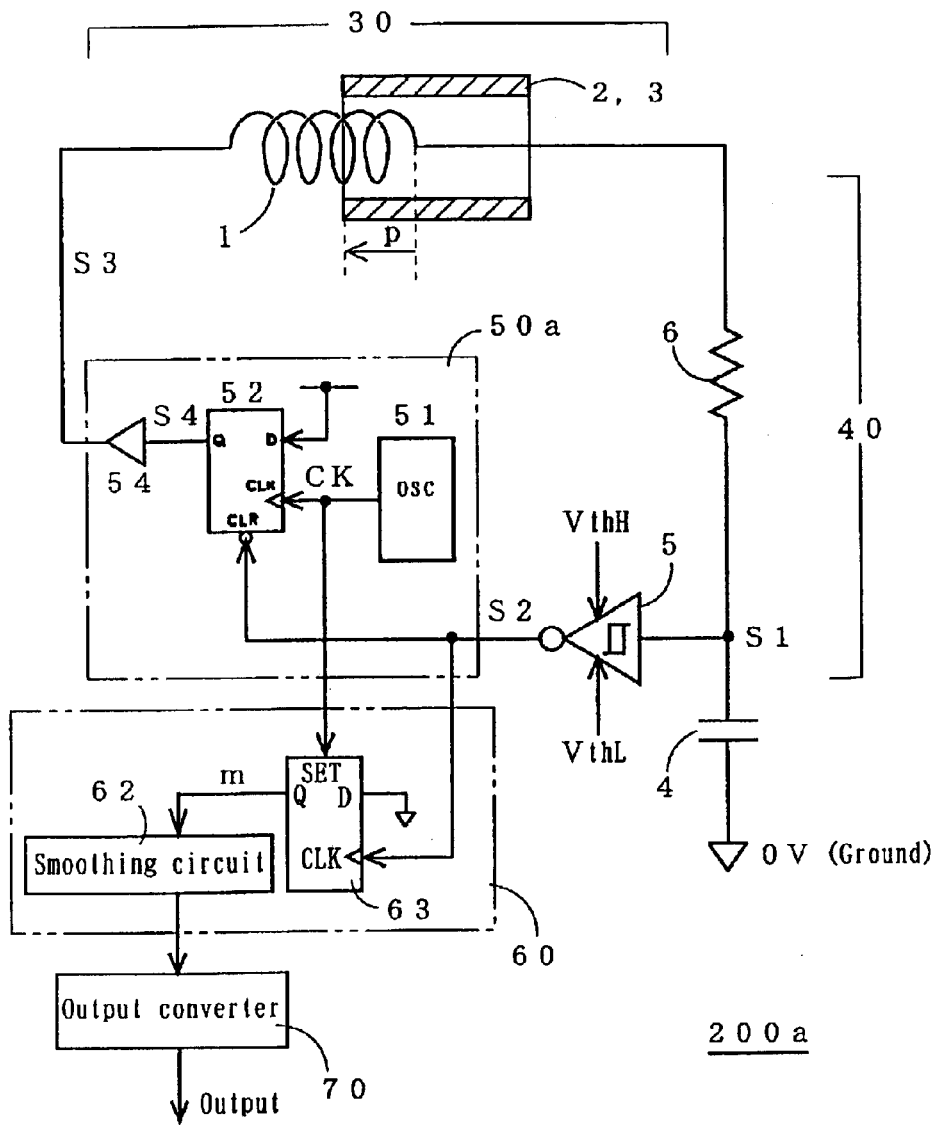
FIG. 6 is a schematic diagram of a position sensor according to a second embodiment of the present invention.

FIG. 6 is a schematic view of a position sensor 200a showing the second embodiment.

The position sensor 200a comprises a displacement detector 30, a pulse output module 40, a timing circuit 50a, a voltage converter 60, and an output converter 70.

The displacement detector 30 comprises a coil 1 and an electric conductor 2 or magnetic member 3.

The electric conductor 2 or magnetic member 3 is located relative to the coil 1 so that its overlapping length p with the coil 1 is varied depending on a positional displacement of the object to be examined.

The coil 1 may be a four-layer roll of 0.071-mm enamel coated copper wire which is 2.3 mm in inner diameter and 22 mm in length and has 1240 turns. The coil 1 may be accommodated in a stainless steel protective tube which is 3 mm in inner diameter and 3.8 mm in outer diameter.

The electric conductor 2 or magnetic member 3 may be made of an aluminum tube which is 4.5 mm in inner diameter and 6.5 mm in outer diameter.

The pulse output module 40 comprises a capacitor 4, a comparator 5, and a resistor 6. The capacitor 4 may be of 15000 pF type. The resistor 6 may be of 60 Ω type.

The capacitor 4 is connected at one end to an input port of the comparator 5 and at the other end to a 0 V source or the ground. The resistor 6 is connected in series with the coil 1. The series circuit of the coil 1 and the resistor 6 is connected at one end to the input port of the comparator 5. The output port of the comparator 5 is connected to an input port of the timing circuit 50a.

The comparator 5 is of an inverted output type for releasing a high level output when the input voltage S1 is increasing and remains not higher than an upper threshold VthH and a low level output when the input voltage S1 exceeds the upper threshold VthH. Alternatively, it releases a low level output when the input voltage S1 is deceasing and remains not lower than a lower threshold VthL and a high level output when the input voltage S1 drops down from the lower threshold VthL.

The timing circuit 50a comprises an oscillator 51, a flip-flop 52, and a buffer 54. The oscillator 51 may be arranged to produce a square wave which has a duty ratio of 1:1 at 100 kHz.

The buffer 54 in the timing circuit 50a is connected at its output port to the other end of the series circuit of the coil 1 and the resistor 6.

The voltage converter 60 comprises a flip-flop 63 for setting the output to a high level when a clock signal CK of the oscillator 51 remains at the high level and resetting the output to a low level in response to the rise of the output voltage S2 from the comparator 5, that is, producing a square wave m of a pulse width t which extends from the rise of the clock signal CK to the rise of the output voltage S2 of the comparator 5 after the clock signal CK is turned to the low level, and a smoothing circuit 62 for producing a voltage output which is proportional to the area defined by the unit time of the square wave m. This arrangement acts as a frequency-to-voltage converter circuit which will be explained later in more detail.

The output converter 70 is designed for releasing a voltage or current corresponding to the output voltage from the voltage converter 60 or examining whether the output voltage from the voltage converter 60 is lower or higher than a predetermined threshold to produce a switching output.

The action of the position sensor 200*a* will now be described in more detail.

Figure 7:
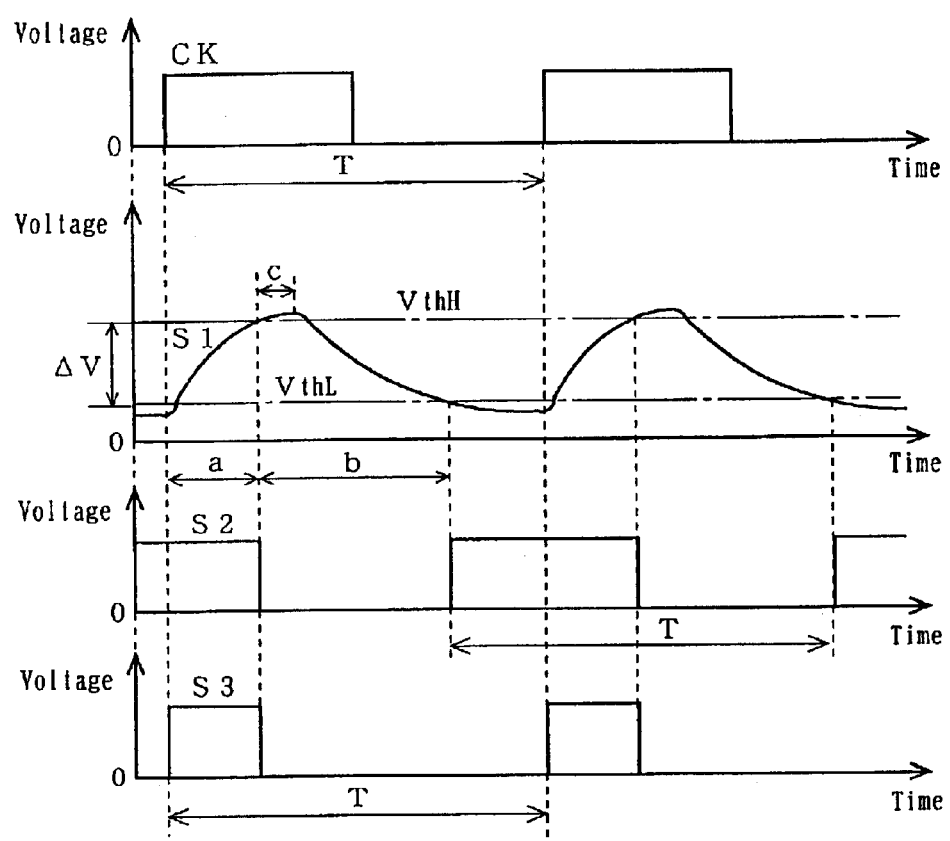
FIG. 7 is a waveform diagram of the waveform of comparative signals in the position sensor of the second

As shown in FIG. 7, the oscillator 51 in the timing circuit 50*a* produces the clock signal CK at intervals of a period T. With timing of the rise of the clock signal CK, the output S4 of the flip-flop 52, that is, the output signal S3 of the buffer 54 is turned to the high level.

While the output signal S3 from the buffer 54 remains at the high level as denoted by a in FIG. 7, the capacitor 4 is charged from the output port of the buffer 54 at a time constant determined by a combination of the coil 1, the resistor 6, and the capacitor 4. This allows the input voltage S1 of the comparator 5 to came into the upward mode.

The output voltage S2 from the comparator 5 remains at the high level before the input voltage S1 of the comparator 5 reaches the upper threshold VthH.

When the input voltage S1 of the comparator 5 exceeds the upper threshold VthH as denoted by b in FIG. 7, the output voltage S2 from the comparator 5 is turned to the low level (0 V or the ground level). Consequently, the output S4 of the flip-flop 52 or the output signal S3 of the buffer 54 is turned to the low level.

While the output voltage S3 from the buffer 54 regains at the low level, the capacitor 4 is discharged to the output port of the buffer 54 at the time constant determined by a combination of the coil 1, the resistor 6, and the capacitor 4.

The output voltage S2 from the comparator 5 remains at the low level before the input voltage S1 of the comparator 5 drops down to the lower threshold VthL.

The input voltage S1 of the comparator 5 is not declined immediately after the output voltage S3 from the buffer 54 is turned back to the low level but first overshot and then lowered as denoted by c in FIG. 7.

When the input voltage S1 of the comparator 5 becomes lower than the lower threshold VthL, the output voltage S2 from the comparator 5 is turned to the high level. As timed with the rise of the clock signal CK while the output voltage S2 from the comparator 5 remains at the high level, the output Q of the flip-flop 52 or the output signal S3 of the buffer 54 is turned to the high level and the action returns back to the above steps. Through repeating those steps, the oscillation can continuously be performed.

The oscillation can hence be conducted at steadiness when the two thresholds VthH and VthL in the comparator 5 are characterized with hysteresis as the upper threshold VthH> the lower threshold VthL and the voltage difference ΔV shown in FIG. 7 is maintained at a sufficient level.

The oscillation may successfully be conducted by overshooting the output with the help of an back electromotive force on the coil 1 even if the two thresholds VthH and VthL in the comparator 5 are not characterized with hysteresis as VthH=VthL.

The inductance of the coil 1 in the displacement detector 30 can be varied depending on the displacement of the object to be examined as the overlapping length p between the coil 1 and the electric conductor 2 or magnetic member 3 changes. The time constant of the capacitor 4 during the charging and discharging is likely decreased when the inductance of the coil 1 is low as denoted by the real line in FIG. 8. Hover, the time constant of the capacitor 4 is increased when the inductance of the coil 1 is high as denoted by the dotted line in FIG. 8.

But, the period T remains uniform because the timing of starting the charging is strictly controlled by the clock signal CK of the oscillator 51. The interval t from the rise of the clock signal CK to the rise of the output voltage S2 is decreased when the inductance of the coin 1 is low as denoted by the real lane in FIG. 8. The interval t is increased when the inductance of the coil 1 is high as denoted by the dotted line in FIG. 8.

Figure 8:
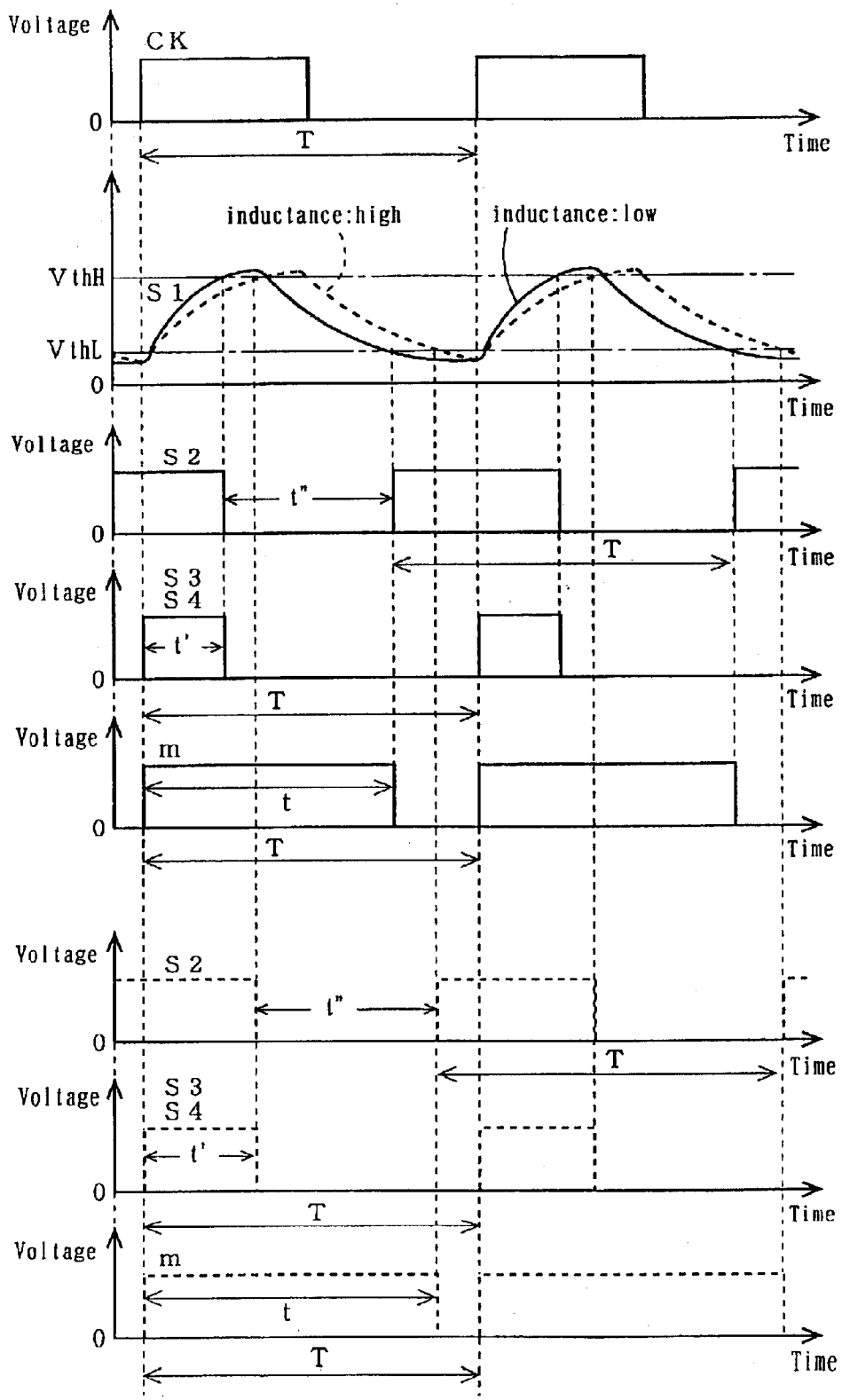
FIG. 8 is a waveform diagram of the waveform of comparative signals classified by the value of inductance in the position sensor of the second embodiment.

As shown in FIG. 8, the flip-flop 63 in the voltage converter 60 produces a square wave m of a pulse width t at intervals of a period T corresponding to the inductance of the coil 1.

The smoothing circuit 62 in the voltage converter 60 outputs an effective value of the square wave m and releases it as the output voltage.

When the inductance of the coil 1 is low and the pulse width t of the signal is snort as denoted by the real line in FIG. 8, the output voltage becomes small.

On the contrary, when the inductance of the coil 1 is high and the pulse width t of the signal is long as denoted by the dotted line in FIG. 8, the output voltage become great.

Accordingly, its output can be a detection signal indicating the location of the object to be examined when the output converter 70 produces a level of voltage or current which corresponds to the output voltage from the voltage converter 60.

On the other hand, it is examined whether the output voltage from the voltage converter 60 is lower or higher than the threshold to generate the switching output which can be a judgment signal indicating that the object to be examined is located a particular side of the threshold point.

Figure 9:
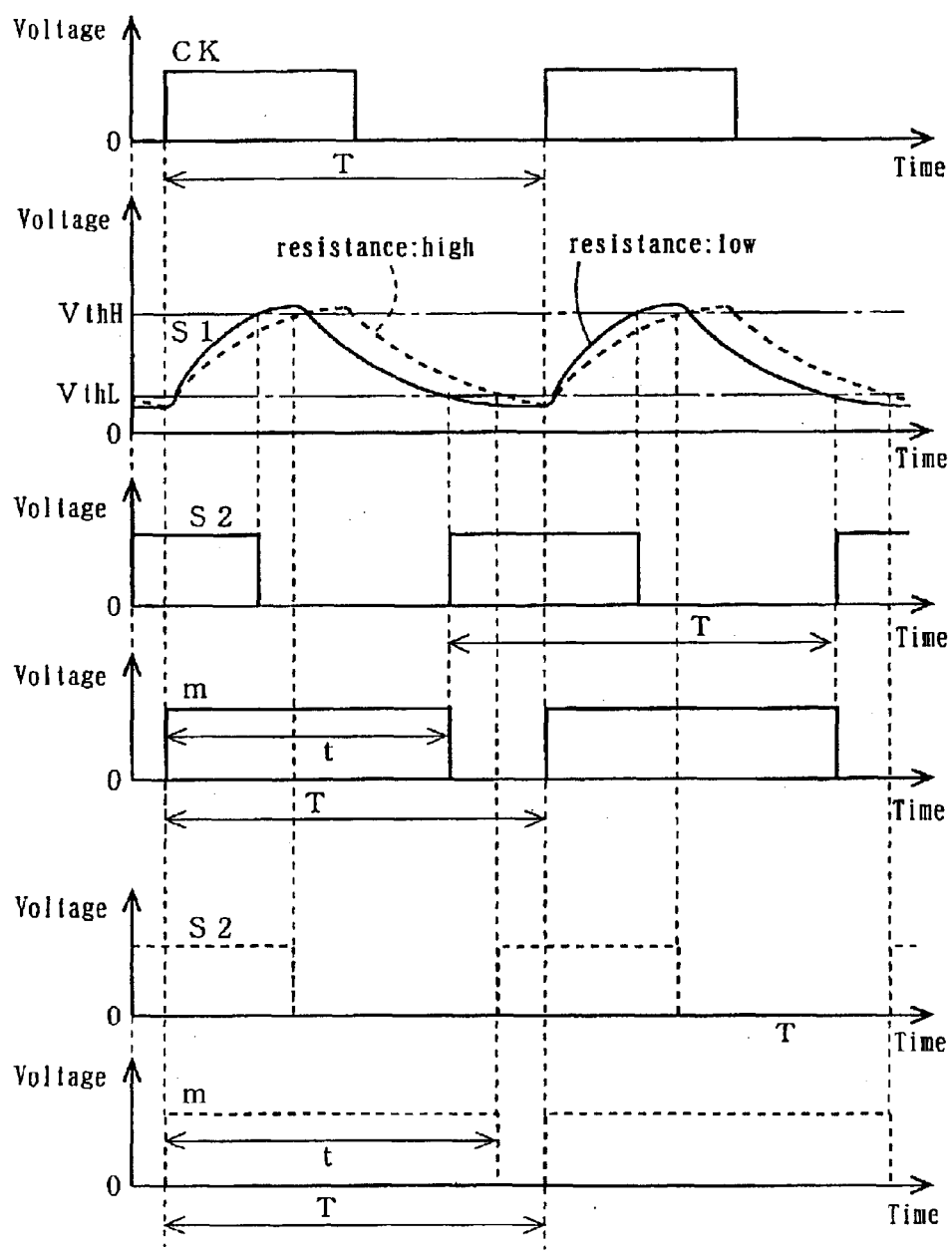
FIG. 9 is a waveform diagram of the waveform of comparative signals classified by the value of resistance in the position sensor of the second embodiment.

FIG. 9 is a waveform diagram when the resistance of the resistor 6 is varied with the thresholds VthH and VthL of the comparator 5 and the resistance of the coil 1 and the capacitor 4 remaining unchanged.

The waveform denoted by the real line is when the resistance of the resistor 6 is low while the waveform denoted by the dotted line is when the resistance is high. The higher the resistance of the resistor 6, the longer the pulse width t of the signal will be increased.

Accordingly, when the resistance of the resistor 6 or the coil 1 is varied due to temperature change, the pulse width t will be unstable thus making a position detection error. It is hence necessary to compensate the temperature.

The pulse width t depends on the time constant for charging and discharging of the capacitor 4 and will presumably be increased when the resistance of the resistor 6 or the coil 1 increases. More specifically, it presumably has a characteristic curve shown in FIG. 10*a*.

Figure 10:
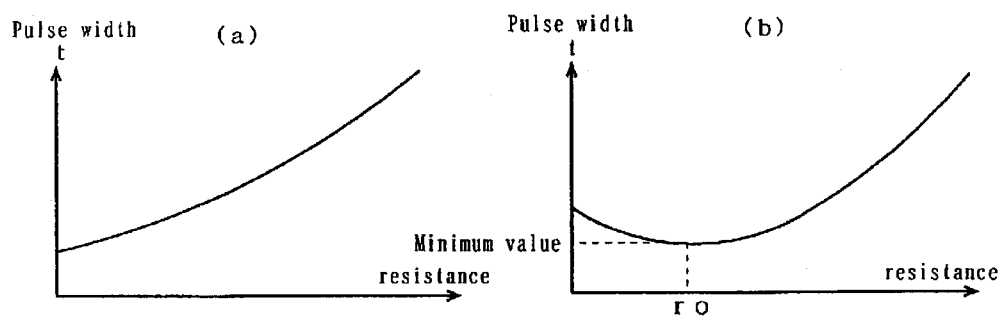
FIG. 10 is a graphic diagram showing the relationship between the period T and the resistance of a resistor in the position sensor of the second embodiment.

It is however found through a series of experiments conducted by the inventors that the pulse width t is denoted not only as the characteristic curve in FIG. 10*a* but also as that in FIG. 10*b*. It was measured that under a certain condition, the pulse width t became decreasing as the resistance increased from 0 Ω and the pulse width t reached the minimum value and then became increasing.

The reason why the pulse width t becomes shortest at the point is not ascertained but may closely be related with some factors including the oscillation of the voltage by the effect of back electromotive force on the coil 1 and the phase of charging and discharging currents. Alternatively, the event may result from an overshoot denoted by c in FIG. 7. Also, the event may result from the mutual interference between the time constant for charging or discharging the capacitor 4 and the period T of the clock signal CK.

It is thus adjusted in the position sensor 200*a* of this embodiment that a sun of the resistance of the coil 1 and the resistance of the resistor 6 within an operating range of the temperature is set to or about a specific level ro shown in FIG. 10*b*.

This permits a change in the pulse width t to r minimum even when the coil 1 is varied in the temperature and thus in the resistance.

The reason why the sum of the resistance is set to or about the specific level ro is now explained. As the coil 1 is varied in the temperature, its static capacitance or shape as well as its resistance may change. It is hence true that the specific level ro of the resistance is hardly ideal for the temperature compensation. It is however proved that the resistance is one of the major causes for varying the period T and its optimum level for the temperature compensation rarely deviates far from ro.

The measurement was carried out with the position sensor 200*a* which included the coil 1 of 3 mm in outer diameter and the electric conductor 2 made of an aluminum tube and of which the measuring distance (the maximum of p) was 50 mm. With the temperature of the coil 1 varying from 25° C. to 75° C., the rate of changed value per 1° C. to the full scale change was from 30 ppm to 50 ppm. The order of 30 ppm is substantially equivalent to the thermal expansion factor of the coil 1 or the aluminum tube and the measurement below 30 ppm will be impractical.

The advantages of the position sensor 200*a* of the second embodiment are:

that its dimensions can be minimized because two traditional coils of magnetizing type or differential type are replaced by the single coil 1 and its use will be favorable in a small sized system or at a limited installation area, that its output voltage is proportional to the displacement of an object and can preferably be employed when the measurement of the position along a linear direction is underscored in the linearity, and that the temperature compensation can be done with no use of two traditional coils of differential type and temperature change will rarely give any influence to the displacement to be measured.

While the temperature compensation in this embodiment is carried out through adjusting the sum of the resistance of the coil 1 and the resistance of the resistor 6, it may be implemented by determining the capacitance of the capacitor 4 and the thresholds VthH and VthL of the comparator 5. The capacitance of the capacitor 4 and the thresholds VthH and VthL of the comparator 5 can be determined by checking the relationship between the period T and such values as the capacitance and the threshold voltages and finding the values which make the period T minimum at a desired range of the temperature. Alternatively, the temperature compensation can be conducted by controlling the period T of the clock signal CK because the continuous oscillation is affected by the time when starting the succeeding period T during the charging or discharging of the capacitor 4. Moreover, the temperature compensation can be carried out through controlling the waveform of a voltage applied to the coil 1 because the continuous oscillation is affected by the shape of a pulse of the waveform which is sharp or dull. It is however easy and practical in the actual operation to control the resistance of the resistor 6 with the other conditions remaining fixed.

(Third Embodiment)

A third embodiment of the present invention is arranged to produce a desired level of output voltage even when the time constant determined by a combination of the coil 1, the resistor 6, and the capacitor 4 is much smaller than the period T of the clock signal CK. This may occur when the inductance of the coil 1 becomes low due to dimensional limitations. In this case, the output voltage may be low in the second embodiment.

Figure 11:
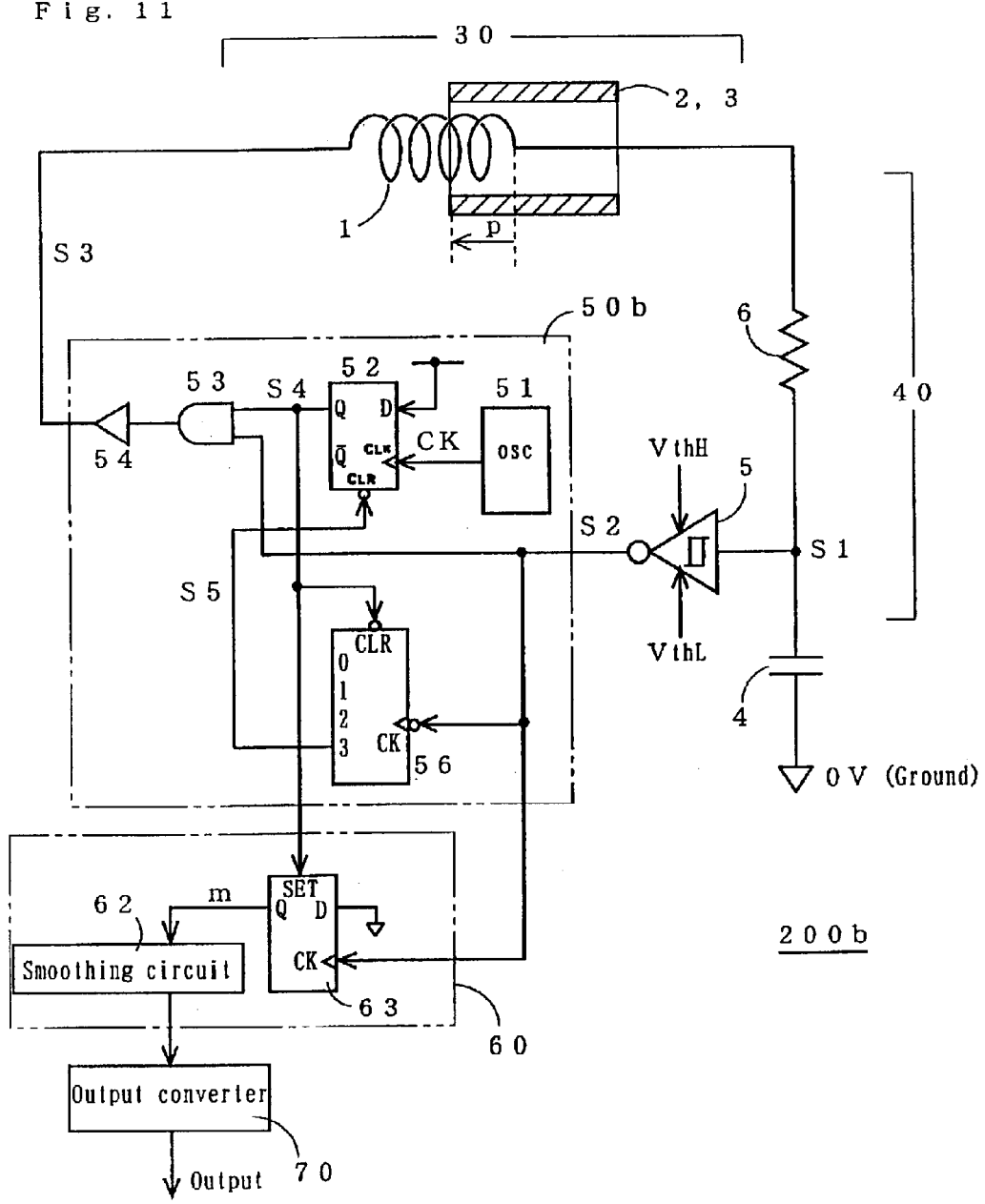
FIG. 11 is a schematic diagram of a position sensor according to a third embodiment of the present invention.

FIG. 11 is a schematic view of a position sensor 200*b* showing the third embodiment.

The position sensor 200*b* is substantially identical in the arrangement to the position sensor 200*a* of the second embodiment, excluding a timing circuit 50*b*.

The timing circuit 50*b* comprises an oscillator 51, a flip-flop 52, an AND circuit 53, a buffer 54, and a counter circuit 56.

The buffer 54 in the timing circuit 50*b* is connected at its output port to the other end of the series circuit composed by the coil 1 and the resistor 6.

The voltage converter 60 comprises a flip-flop 63 for setting the output to a high level when an output signal S4 of the flip-flop 52 reins at the high level and resetting the output to a low level in response to the rise of the output voltage S2 from the comparator 5, that is, producing a square wave m of a pulse width t which extends from the rise of the output signal S4 to the rise of the output voltage S2 of the comparator 5 after the voltage output S4 is turned to the low level, and a smoothing circuit 62 for producing a voltage output which is proportional to the area defined by the unit time of the square wave m. This arrangement acts as a frequency-to-voltage converter circuit which will be explained later in more detail.

The action of the position sensor 200*b* will now be described in more detail.

It is assumed that the output signal S2 of the comparator 5 is at the high level in the initial state. Also, the output signal S4 of the flip-flop 52 is set to the low level. The counter circuit 56 counts zero and its "3" port output signal S5 remains at the low level.

Figure 12:
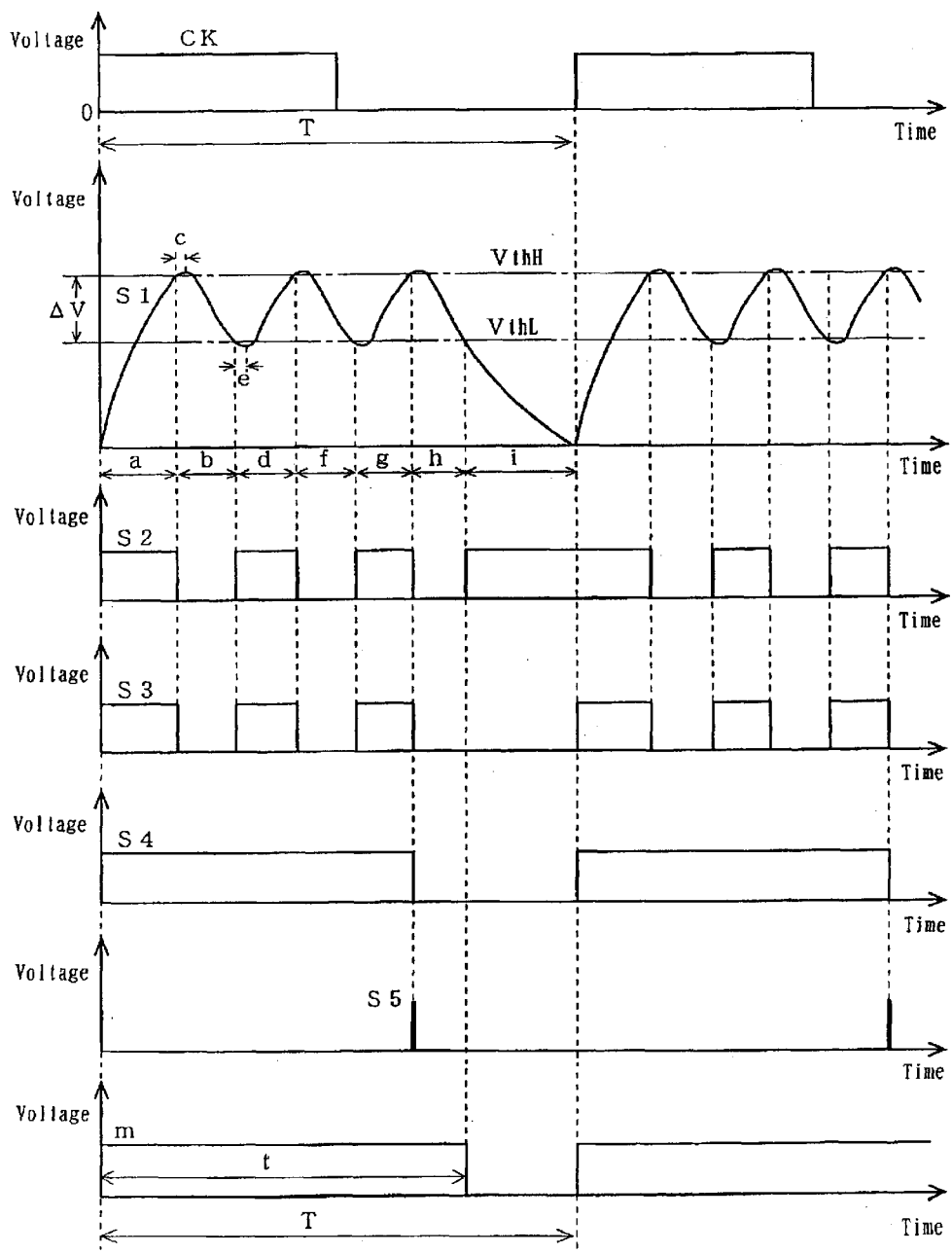
FIG. 12 is a waveform diagram of the waveform of comparative signals in the position sensor of the third embodiment.

As shown in FIG. 12, the oscillator 51 in the timing circuit 50*b* produces the clock signal CK at intervals of a period T. With timing of the rise of the clock signal CK, the output S4 of the flip-flop 52 is turned to the high level.

At the time, the output of the AND circuit 53, that is, the output signal S3 of the buffer 54 is at the high level when the output signal S2 from the comparator 5 remains at the high level.

While the output signal S3 from the buffer 54 remains at the high level as denoted by a in FIG. 12, the capacitor 4 is charged from the output port of the buffer 54 at a time constant determined by a combination of the coil 1, the resistor 6, and the capacitor 4. This allows the input voltage S1 of the comparator 5 to come into the upward mode.

The output voltage S2 from the comparator 5 remains at the high level before the input voltage S1 of the comparator 5 reaches the upper threshold VthH.

When the input voltage S1 of the comparator 5 exceeds the upper threshold VthH as denoted by b in FIG. 12, the output voltage S2 from the comparator 5 is turned back to the low level (0 V or the ground level). Then, the counter circuit 56 counts the decay of the output voltage S2 from the comparator 5 and its count shifts to "1". By now, the "3" port output signal S5 of the counter circuit 56 remains at the low level. Also, the output of the AND circuit 53 or the output signal S3 of the buffer 54 is turned to the low level.

While the output voltage S3 from the buffer 54 remains at the low level, the capacitor 4 is discharged to the output port of the buffer 54 at the time constant determined by a combination of the coil 1, the resistor 6, and the capacitor 4.

The output voltage S2 from the comparator 5 mains at the low level before the input voltage S1 of the comparator 5 drops down to the lower threshold VthL.

The input voltage S1 of the comparator 5 is not declined immediately after the output voltage S3 from the buffer 54 is turned back to the low level but first overshot and then increased as denoted by c in FIG. 12.

When the input voltage S1 of the comparator 5 becomes lower than the lower threshold VthL, the output voltage S2 from the comparator 5 is turned to the high level as denoted by d in FIG. 12. Then, the output of the AND circuit 53 or the output signal S3 of the buffer 54 is turned to the high level.

While the output voltage S3 from the buffer 54 remains at the high level, the capacitor 4 is charged from the output port of the buffer 54 at the time constant determined by a combination of the coil 1, the resistor 6, and the capacitor 4.

The input voltage S1 of the comparator 5 is not elevated immediately after the output voltage S3 from the buffer 54 is turned back to the high level but first overshot and then increased as denoted by e in FIG. 12.

When the input voltage S1 of the comparator 5 exceeds the upper threshold VthH, the output voltage S2 from the comparator 5 is turned to the low level as denoted by f in FIG. 12. Then, the counter circuit 56 counts the decay of the output voltage S2 from the comparator 5 and its count shifts to "2". By now, the "3" port output signal S5 of the counter circuit 56 remains at the low level. The output of the AND circuit 53 or the output signal S3 of the buffer 54 is hence turned to the low level.

While the output voltage S3 from the buffer 54 remains at the low level, the capacitor 4 is discharged to the output port of the buffer 54 at the time constant determined by a combination of the coil 1, the resistor 6, and the capacitor 4.

The output voltage S2 from the comparator 5 remains at the low level before the input voltage S1 of the comparator 5 drops down to the lower threshold VthL.

When the input voltage S1 of the comparator 5 becomes lower than the lower threshold VthL, the output voltage S2 from the comparator 5 is turned to the high level as denoted by g in FIG. 12. Then, the output of the AND circuit 53 or the output signal S3 of the buffer 54 is turned to the high level.

While the output voltage S3 from the buffer 54 remains at the high level, the capacitor 4 is charged from the output port of the buffer 54 at the time constant determined by a combination of the coil 1, the resistor 6, and the capacitor 4.

When the input voltage S1 of the comparator 5 exceeds the upper threshold VthL, the output voltage S2 from the comparator 5 is turned to the low level as denoted by h in FIG. 12. Then, the counter circuit 56 counts the decay of the output voltage S2 from the comparator 5 and its count shifts to "3". This causes the "3" port output signal S5 of the counter circuit 56 to turn to the high level. Accordingly, as timed with the rise of the "3" port output signal S5, the output signal S4 of the flip-flop 52 is turned to the low level. Then, the counter circuit 56 is cleared to shift its count to "0". Consequently, the "3" port output signal S5 from the counter circuit 56 is turned back to the low level.

Simultaneously, the output of the AND circuit 53 or the output signal S3 of the buffer 54 is hence turned to the low level.

While the output voltage S3 from the buffer 54 remains at the low level, the capacitor 4 is discharged to the output port of the buffer 54 at the time constant determined by a combination of the coil 1, the resistor 6, and the capacitor 4.

The output voltage S2 from the comparator 5 remains at the low level before the input voltage S1 of the comparator 5 drops down to the lower threshold VthL.

When the input voltage S1 of the comparator 5 becomes lower than the lower threshold VthL, the output voltage S2 from the comparator 5 is turned to the high level as denoted by i in FIG. 12 However, with the output signal S4 from the flip-flop 52 being at the low level, the output of the AND circuit 53, that is, the output signal S3 of the buffer 54 remain at the low level. This allows the capacitor 4 to be continuously discharged to the output port of the buffer 54.

Then, as timed with the rise of the clock signal CK, the output S4 of the flip-flop 52 is turned to the high level and the action returns back to the above steps. Through repeating those steps, the oscillation can continuously be performed.

The oscillation can hence be conducted at steadiness when the two threshold VthH and VthL in the comparator 5 are characterized with hysteresis as the upper threshold VthH> the lower threshold VthL and the voltage difference ΔV shown in FIG. 12 is maintained at a sufficient level.

The oscillation may successfully be conducted by overshooting the output with the help of an back electromotive force on the coil 1 even if the two thresholds VthH and VthL in the comparator 5 are not characterized with hysteresis as VthH=VthL.

As shown in FIG. 12, the flip-flop 63 in the voltage converter 60 produces a square wave output m of a pulse width t which extends from the rise of the output signal S4 of the flip-flop 52 to the rise of the output voltage S2 from the comparator 5 after the output signal S4 is turned to the low level.

The inductance of the coil 1 in the displacement detector 30 can be varied depending on the displacement of the object to be examined as the overlapping length p between the coil 1 and the electric conductor 2 or magnetic member 3 changes. As explained, the time constant of the capacitor 4 during the charging and discharging is likely decreased when the inductance of the coil 1 is low but the time constant is increased when the inductance of the coil 1 is high.

However, the period T remains uniform because the timing of starting the charging or discharging is strictly controlled by the clock signal CK of the oscillator 51. The pulse width t of the square wave output m is decreased when the inductance of the coil 1 is low and pulse width t is increased when the inductance of the coil 1 is high.

The smoothing circuit 62 in the voltage converter 60 outputs an effective value of the square wave m and releases it as the output voltage. Accordingly, when the inductance of the coil 1 is low and the pulse width t of the signal is short, the output voltage becomes small. On the contrary, when the inductance of the coil 1 is high and the pulse width t of the signal is long, the output voltage becomes great.

Therefore, its output can be a detection signal indicating the location of the object to be examined when the output converter 70 produces a level of voltage or current which corresponds to the output voltage from the voltage converter 60.

Also, it is examined whether the output voltage from the voltage converter 60 is lower or higher than the threshold to generate the switching output which can be a judgment signal indicating that the object to be examined is located a particular side of the threshold point.

Similar to the position sensor 200a of the second embodiment, the position sensor 200b of the this embodiment causes the pulse width t to turn unstable when the resistance of the resistor 6 or the coil 1 is varied due to temperature change, thus making a position detection error. It is hence necessary to compensate the temperature.

The pulse width t depends on the tire constant for charging and discharging of the capacitor 4 and will presumably be increased when the resistance of the resistor 6 or the coil 1 increases. More specifically, it presumably has a characteristic curve shown in FIG. 10a.

It is however found through a series of experiments conducted by the inventors that the pulse width t is denoted not only as the characteristic curve in FIG. 10a but also as that in FIG. 10b. Under a certain condition, the pulse width t became short as the resistance increased from 0 Ω. The pulse width t was measured shortest at a point and then became long.

The reason why the pulse width t becomes shortest at the point is not ascertained but may closely be related with some factors including the oscillation of the voltage by the effect of back electromotive force on the coil 1 and the phase of charging and discharging currents. Alternatively, the event may result from overshoots denoted by c and e in FIG. 12. Also, the event may result from mutual interference between the time constant for charging or discharging the capacitor 4 and the period T of the clock signal CK.

It is thus adjusted in the position sensor 200b of this embodiment that a sun of the resistance of the coil 1 and the resistance of the resistor 6 within an operating range of the temperature is set to or about a specific level ro shown in FIG. 10b.

This permits a change in the pulse width t to be minimized even when the coil 1 is varied in the temperature and thus in the resistance.

The reason why the sun of the resistance is set to or about the specific level ro is now explained. As the coil 1 is varied in the temperature, its static capacitance or shape as well as its resistance may change. It is hence true that the specific level ro of the resistance is hardly ideal for compensating the temperature. It is however proved that the resistance is one of the major causes for varying the pulse width t and its optimum level for compensation the temperature rarely deviate far from the level ro.

The measurement was carried out with the position sensor 200b which included the coil 1 of 3 mm in outer diameter and the electric conductor 2 made of an aluminum tube and of which the measuring distance (the maximum of p) was 50 mm. With the temperature of the coil 1 varying from 25° C. to 75° C., the rate of displacement to the (full scale) change was from 30 ppm to 50 ppm for every 1° C.. The order of 30 ppm is substantially equivalent to the thermal expansion factor of the coil 1 or the aluminum tube and the measurement below 30 ppm will be impractical.

The advantages of the position sensor 200b of the third embodiment are:

that its dimensions can be minimized because two traditional coils of magnetizing type or differential type are replaced by the single coil 1 and its use will be favorable in a small sized system or at a limited installation area, that its output voltage is proportional to the displacement and can preferably be employed when the measurement of the position along a linear direction is underscored in the linearity, that the temperature compensation can be done with no use of two traditional coils of differential type and temperature change will rarely give any influence to the displacement to be measured, and that the voltage output can remain at a sufficient level even when the inductance of the coil 1 is low due to dimensional limitations.

While the temperature compensation in this embodiment is carried out through adjusting the sun of the resistance of the coil 1 and the resistance of the resistor 6, it may be implemented by determining the capacitance of the capacitor 4 and the thresholds VthH and VthL of the comparator 5. The capacitance of the capacitor 4 and the thresholds VthH and VthL of the comparator 5 can be determined by checking the relationship between the period T and such values as the capacitance and the threshold voltages and finding the values which make the period T minimum at a desired range of the temperature. Alternatively, the temperature compensation can be conducted by controlling the period T of the clock signal CK because the continuous oscillation is adversely affected by the time when starting the succeeding period T during the charging or discharging of the capacitor 4. Moreover, the temperature compensation can be carried out through controlling the waveform of a voltage applied to the coil 1 because the continuous oscillation is affected by the shape of a pulse of the waveform which is sharp or dull at the leading edge. It is however easy and practical in the actual operation to control the resistance of the resistor 6 with the other conditions remaining fixed.

(Fourth Embodiment)

Figure 13:
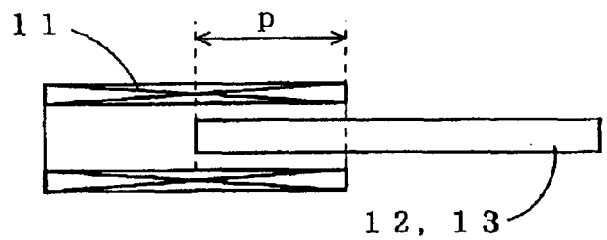
FIG. 13 is a cross sectional view of a displacement detector showing a fourth embodiment of the present invention.

As shown in FIG. 13, the arrangement is modified where an electrical conductor 12 or magnetic member 13 is inserted into the inner space of a coil 11 for detecting the position along a linear direction.

This embodiment is favorable when the volume or weight of the electric conductor 12 or magnetic member 13 is desired to be minimized.

(Fifth Embodiment)

Figure 14:
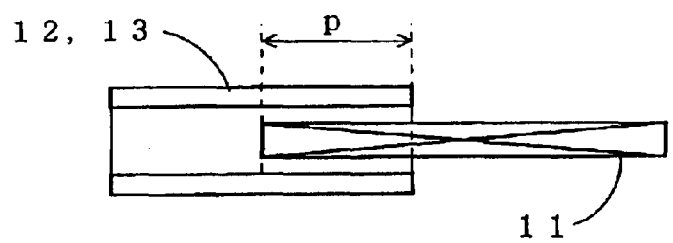
FIG. 14 is a cross sectional view of a displacement detector showing a fifth embodiment of the present invention.

As shown in FIG. 14, the arrangement is modified where an electrical conductor 12 or magnetic m 13 is movably fitted over the outer side of a coil 11 for detecting the position along a linear direction.

This embodiment permits the coil 11 to be easily protected with protective cover and its production can be simple.

One experiment was carried out with the coil 11 which is sized 0.9 mm in the outer diameter and has a measuring distance of 20 mm. It was proved that the output was sufficiently great so that the coil 11 can be further minimized.

Also, another experiment was done with the coil 11 accommodated in a stainless steel pressure vessel which was 5 mm in the outer diameter and 0.5 mm in the thickness. It was proved that the arrangement was favorable for use with a hydraulic cylinder.

A further experiment was done with the coil 11 of a cored type having a magnetic core provided in the center thereof and accommodated in a stainless steel pressure vessel which was 7 mm in the outer diameter and 1 mm in the thickness. It was proved that the stainless steel pressure vessel withstood 1000 atm or higher and thus favorable for use with a common hydraulic system.

(Sixth Embodiment)

Figure 15:
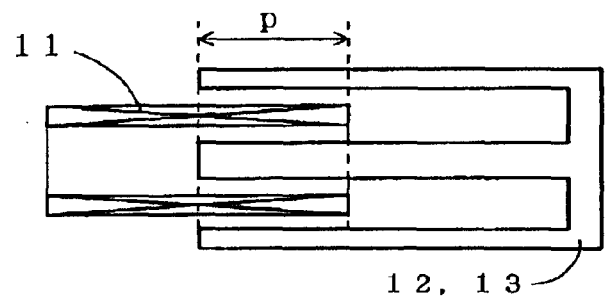
FIG. 15 is a cross sectional view of a displacement detector showing a sixth embodiment of the present invention.

As shown in FIG. 15, the arrangement is modified where an electrical conductor 12 or magnetic member 13 of a particular shape is movably fitted onto and into a coil 11 for detecting the position along a linear direction.

This embodiment permits the output to be significantly increased and can thus favorably be used for improving the resolution.

(Seventh Embodiment)

Figure 16:
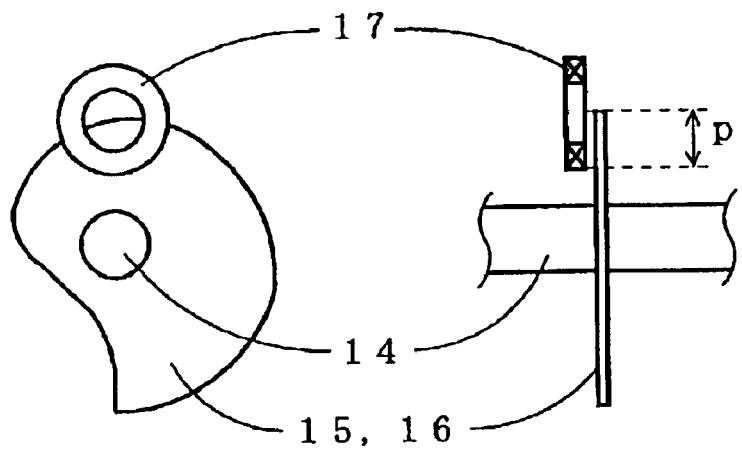
FIG. 16 is a cross sectional view of a displacement detector showing a seventh embodiment of the present invention.

FIG. 16 illustrates this embodiment provided for detecting the position in a circular movement.

An electric conductor 15 or magnetic member 16 of a gradual radial diverging disc shape is fixedly mounted to a rotary shaft 14 and a coil 17 is located so that the size of its overlapping area p is varied as the rotary shaft 14 rotates.

With the arrangement of this embodiment, the angle of rotation can be measured through 270° at maximum. One of its applications is to detect the angle of rotation on a rotary solenoid or a rotary actuator driven by pneumatic or hydraulic power.

(Eighth Embodiment)

Figure 17:
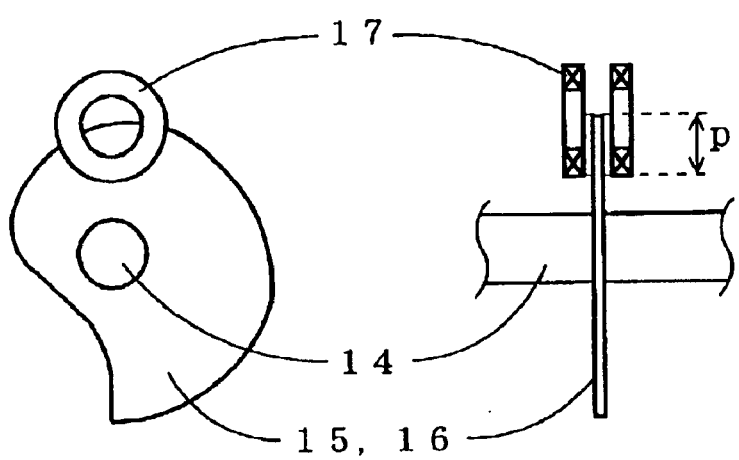
FIG. 17 is a cross sectional view of a displacement detector showing an eighth embodiment of the present invention.

As shown in FIG. 17, the arrangement is modified where while the electric conductor 15 or magnetic member 16 of a gradual radial diverging disc shape is fixedly mounted to the rotary shaft 14, a pair of the coils 17 are located so that the size of its overlapping area p is varied as the rotary shaft 14 rotates and a pair of the coils 17 are connected in series with each other.

This embodiment allows one of the two coils 17 to become closer to the electric conductor 15 or magnetic member 16 even when the other departs far from the electric conductor 15 or magnetic member 16 as the rotary shaft 14 is axially biased by the action of a thrust force, hence offsetting the result of biasing event. Accordingly, the change in the output resulting from the thrust force on the rotary shaft 14 can be avoided.

(Ninth Embodiment)

Figure 18:
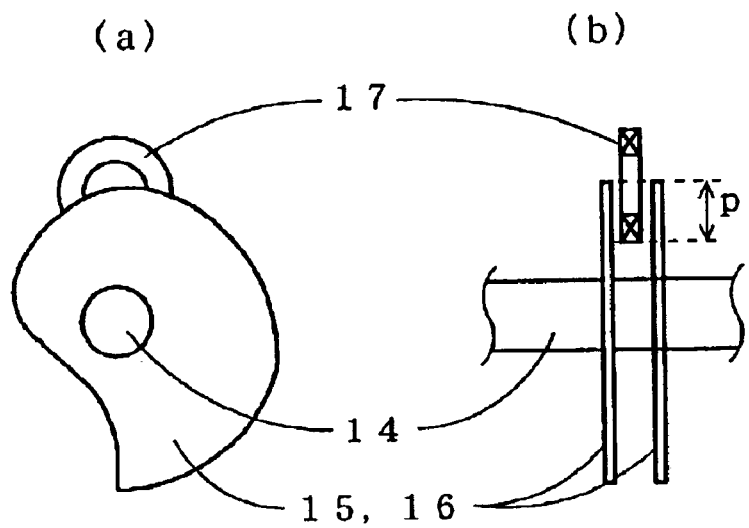
FIG. 18 is a cross sectional view of a displacement detector showing a ninth embodiment of the present invention.

As shown in FIG. 18, the arrangement is modified where while a pair of the electric conductors 15 or magnetic members 16 of a gradual radial diverging disc shape are fixedly remounted to the rotary shaft 14 to be at a distance from and in phase with each other, the coil 17 is located between the pair so that the size of its overlapping area p is varied as the rotary shaft 14 rotates.

This embodiment allows one of the two electric conductors 15 or magnetic members 16 to become closer to the coil 17 even when the other departs far from the the coil 17 as the rotary shaft 14 is axially biased by the action of a thrust force, hence offsetting the result of biasing event. Accordingly, the change in the output resulting from the thrust force on the rotary shaft 14 can be avoided.

(Tenth Embodiment)

Figure 19:
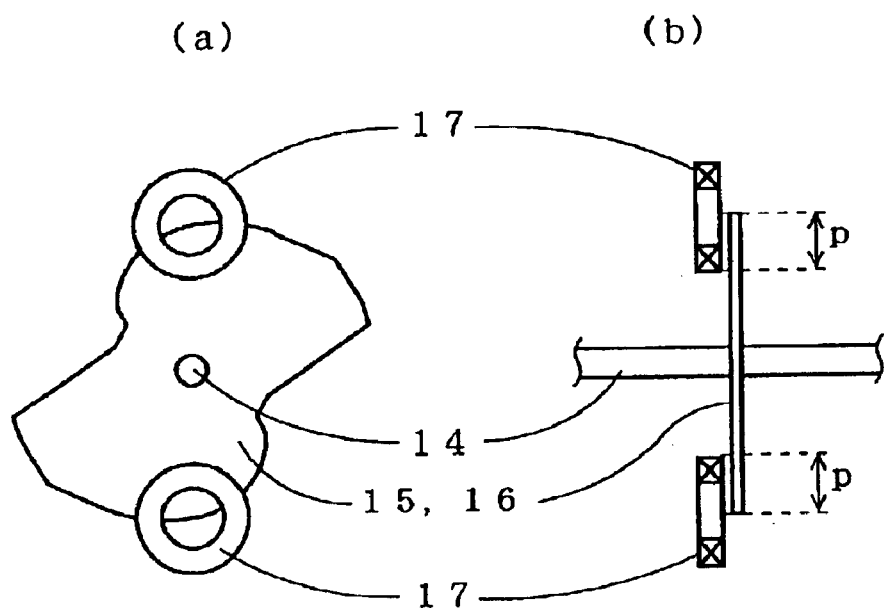
FIG. 19 is a cross sectional view of a displacement detector showing a tenth embodiment of the present invention.

As shown in FIG. 19, the arrangement is modified where while the electric conductor 15 or magnetic member 16 is arranged of a gradual radial diverging disc shape which is symmetrical about the center point and fixedly mounted to the rotary shaft 14, a pair of the coils 17 are connected in series with each other and located in symmetrical relationship about the center point so that the size of their overlapping areas p is varied as the rotary shaft 14 rotates.

This embodiment allows one of the two coils 17 to become greater in the size of the overlapping area p with the electric conductor 15 or magnetic member 16 even when the other remains smaller in the size of the overlapping area p as the rotary shaft 14 is radially biased by the action of a radial force, hence offsetting the result of biasing event. Accordingly, the change in the output resulting from the radial force on the rotary shaft 14 can be avoided.

Also, the arrangement of this embodiment is particularly favorable when the angle of rotation of the rotary shaft 14 is relatively small.

(Eleventh Embodiment)

Figure 20:
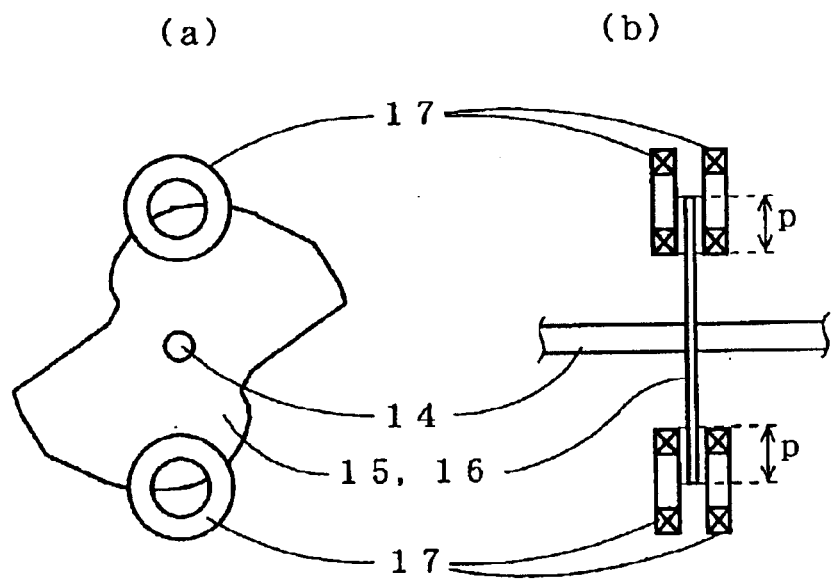
FIG. 20 is a cross sectional view of a displacement detector showing an eleventh dint of the present invention.

As shown in FIG. 20, the arrangement is modified where while the electric conductor 15 or magnetic member 16 is arranged of a gradual radial diverging disc shape which is symmetrical about the center point and fixedly mounted to the rotary shaft 14, two pairs of the coils 17 are connected in series and located in symmetrical relationship about the center point so that each pair of the coils 17 sandwich the electrical conductor 15 or magnetic member 16 from both sides and the size of their overlapping areas p is varied as the rotary shaft 14 rotates.

This embodiment allows one of each pair of the coils 17 to become closer to the electric conductor 15 or magnetic member 16 even when the other departs far from the electric conductor 15 or magnetic member 16 as the rotary shaft 14 is axially biased by the action of a thrust force, hence offsetting the result of biasing event. Accordingly, the change in the output resulting from the thrust force on the rotary shaft 14 can be avoided. Similarly, one of each pair of the coils 17 becomes greater in the size of the overlapping area p with the electric conductor 15 or magnetic member 16 even when the other r smaller in the size of the overlapping area p as the rotary shaft 14 is radially biased by the action of a radial force, hence offsetting the ret of biasing event. Accordingly, the change in the output resulting from the radial force on the rotary shaft 14 can be avoided.

(Twelfth Embodiment)

Figure 21:
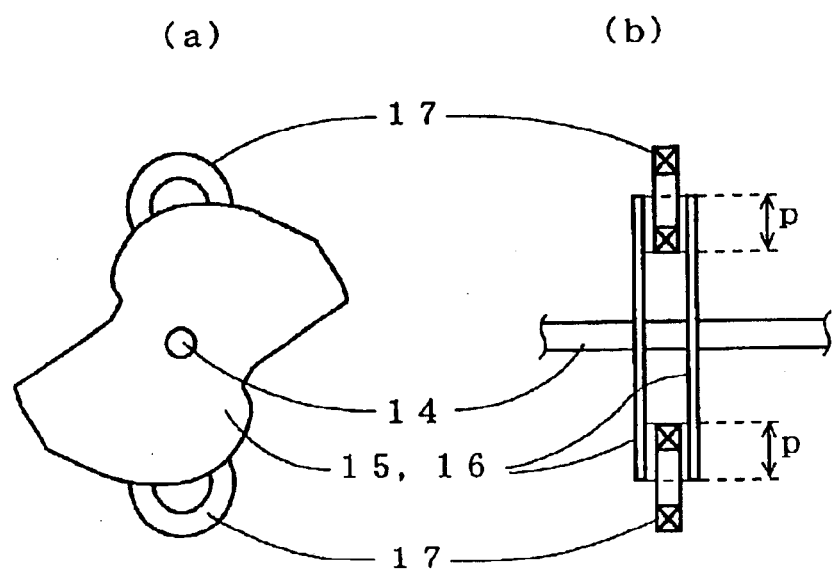
FIG. 21 is a cross sectional view of a displacement detector showing a twelfth embodiment of the present invention.

As shown in FIG. 21, the arrangement is modified where a pair of the electric conductors 15 or magnetic members 16 are equally arranged of a gradual radial diverging disc shape which is symmetrical about the center point and fixedly mounted to the rotary shaft 14 at a distance from and in phase with each other and a pair of the coils 17 are connected in series with each other and located in symmetrical relationship about the center point so that they are sandwiched between the two electrical conductors 15 or two magnetic members 16 and the size of their overlapping areas p is varied as the rotary shaft 14 rotates.

This embodiment allows one of the two electric conductors 15 or magnetic members 16 to become closer to the coil pair 17 even when the other departs far from the coil pair 17 as the rotary shaft 14 is axially biased by the action of a thrust force, hence offsetting the result of biasing event. Accordingly, the change in the output resulting from the thrust force on the rotary shaft 14 can be avoided. Similarly, one of the two coils 17 become greater in the size of the overlapping area p with the electric conductor pairs 15 or magnetic member pairs 16 even when the other reman smaller in the size of the overlapping area p as the rotary shaft 14 is radially biased by the action of a radial force, hence offsetting the result of biasing event. Accordingly, the change in the output resulting from the radial force on the rotary shaft 14 can be avoided.

(Thirteenth Embodiment)

Figure 22:
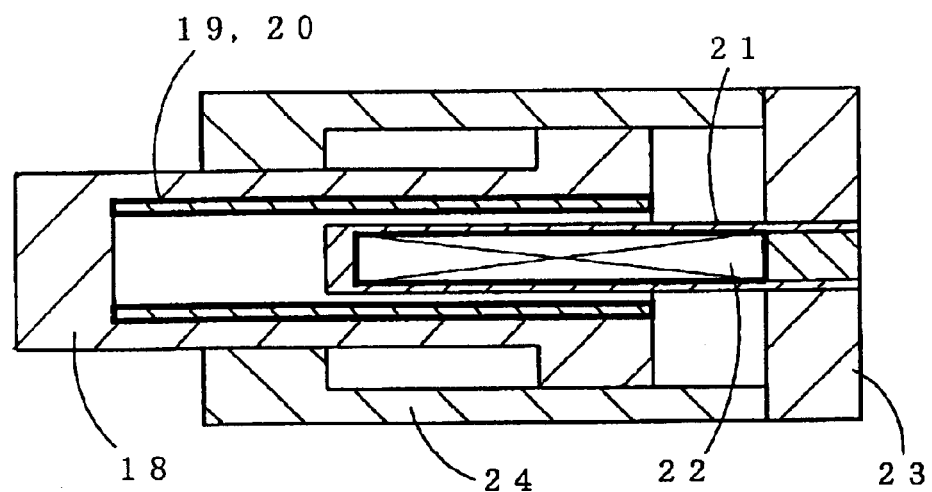
FIG. 22 is a cross sectional view of a displacement detector showing a thirteenth embodiment of the present invention.

FIG. 22 illustrates a further embodiment arranged for measuring the position of a piston rod 18 in a pneumatic or hydraulic cylinder.

The piston rod 18 designed for forward and backward movement in a cylinder tube 24 has a bore provided therein where an electric conductor 19 or magnetic member 20 of a tube shape is fixedly accommodated (cf. the electric conductor 19 or magnetic member 20 is eliminated when the piston rod 18 itself is made of an electrically conductive or magnetic material having the bore). A coil 22 installed in a pressure vessel 21 is fixedly mounted to a cylinder head 22. Simultaneously, the coil 22 in the pressure vessel 21 is positioned to extend into the inner space of the tube shape of the electric conductor 19 or magnetic member 20.

It may preferably be sized that the cylinder tube 24 is 4 mm in the inner diameter, the piston rod 18 is 2 mm in the outer diameter, the piston rod 18 is 1 mm in the bore diameter, and the pressure vessel 21 is 0.9 mm in the outer diameter.

(Fourteenth Embodiment)

Figure 23:
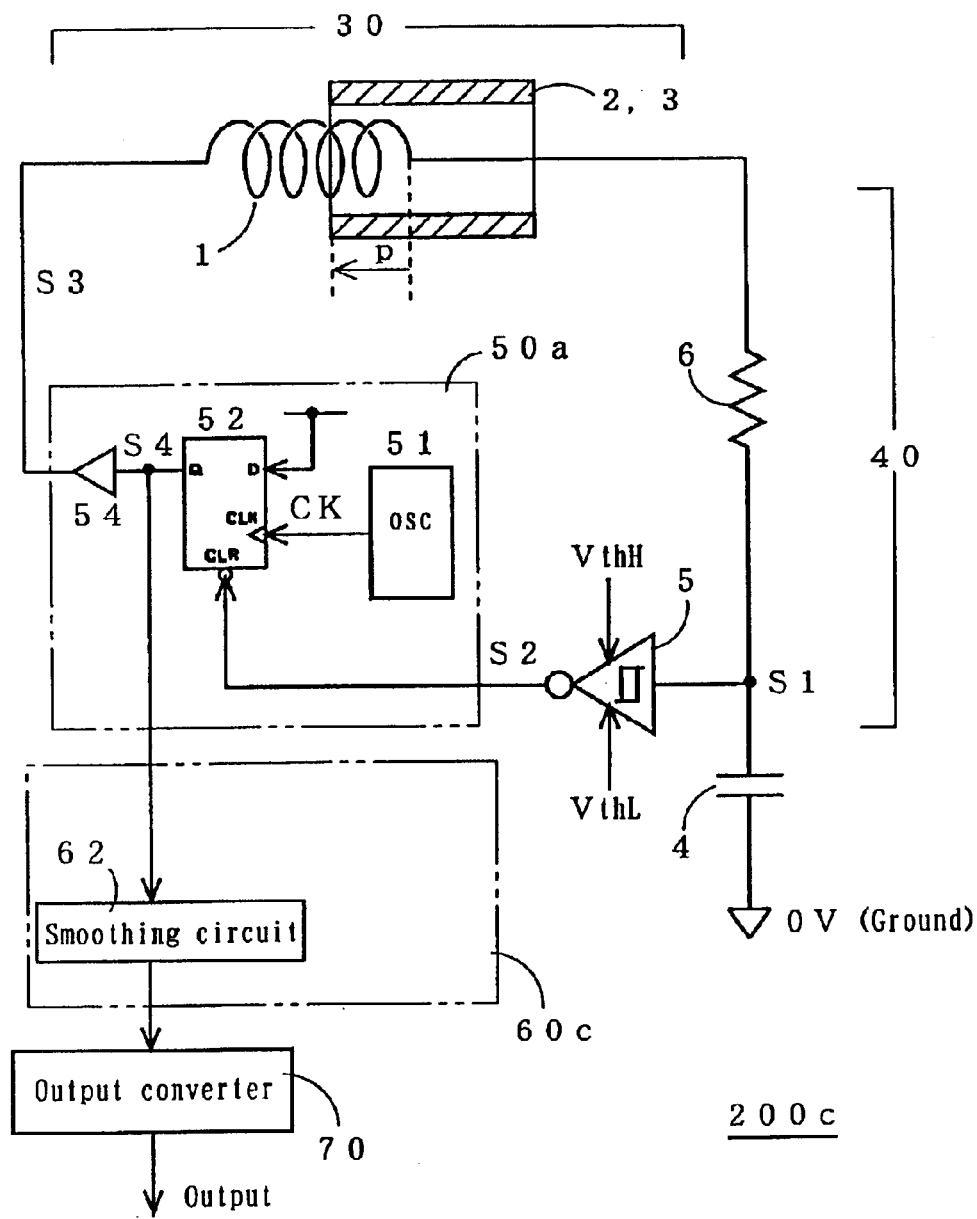
FIG. 23 is a schematic diagram of a position sensor according to a fourteenth embodiment of the present invention.

FIG. 23 is a schematic view of a position sensor 200c showing a fourteenth embodiment of the present invention.

The position sensor 200c is a modification of the second embodiment where the output signal S4 of the flip-flop 52 in the timing circuit 50a is transferred to a voltage converter 60c where its effective value is picked up by a smoothing circuit 62 and released as the output voltage.

The output voltage from the voltage converter 60c is proportional to the pulse width t' of the output signal S4 shown in FIG. 8. The pulse width t' is equal to a duration for charging the capacitor 4 and proportional to a change in the inductance of the coil 1 or a displacement of the object to be examined, thus contributing to the higher degree of the linearity.

(Fifteenth Embodiment)

Figure 24:
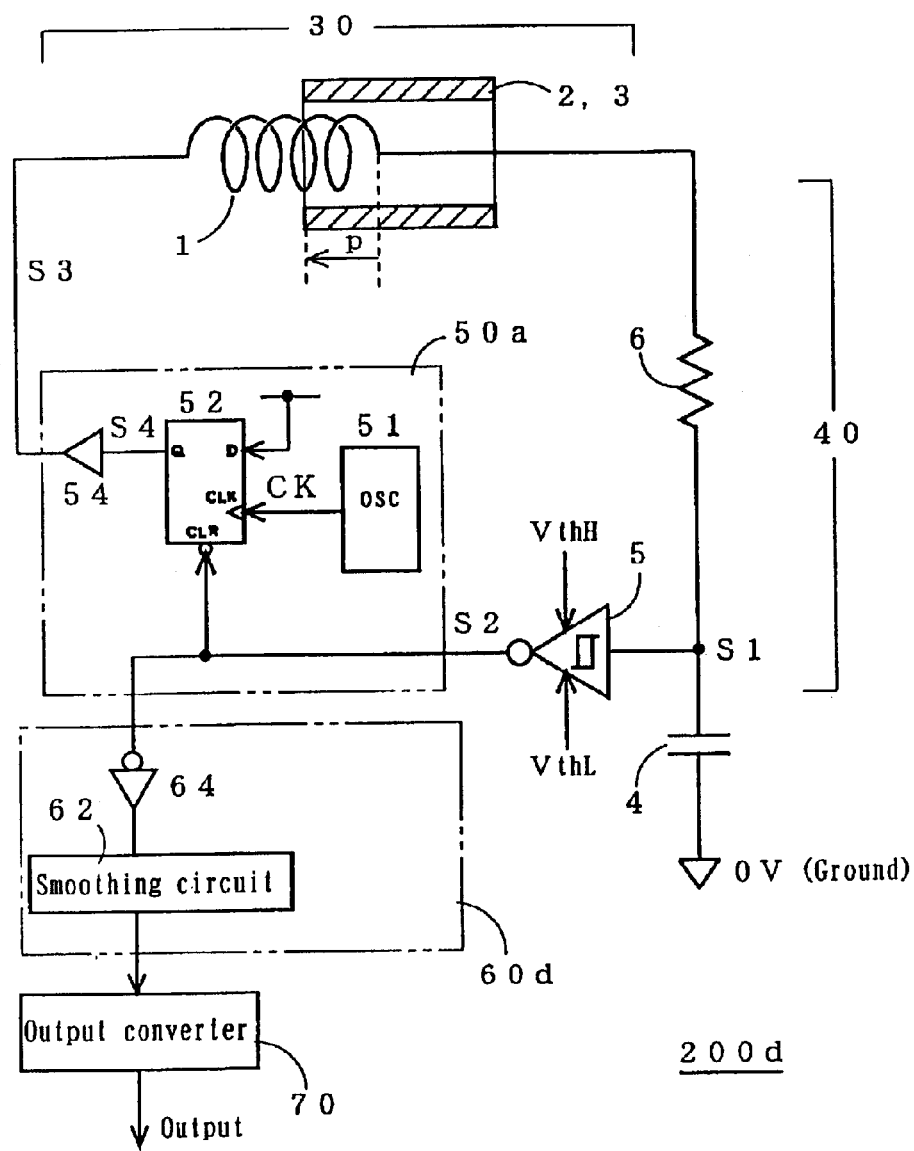
FIG. 24 is schematic diagram of a position sensor according to a fifteenth embodiment of the present invention.

FIG. 24 is a schematic view of a position sensor 200d showing a fifteenth embodiment of the present invention.

The position sensor 200d is another modification of the second embodiment where the output signal S2 of the comparator 5 is transferred to a voltage converter 60d where it is inverted by an inverter circuit 64 and then its effective value is picked up by a smoothing circuit 62 before released as the output voltage.

The output voltage from the voltage converter 60d is proportional to the low level duration t" of the output signal S2 shown in FIG. 8. The low level duration t" is equal to a duration for discharging the capacitor 4 and proportional to a change in the inductance of the coil 1 or a displacement of the object to be examined, thus contributing to the higher degree of the linearity.

(Sixteenth Embodiment)

The period T, pulse width t, pulse width t', or low level duration t" is measured with the use of an electronic counter which in turn releases a voltage proportional to the measurement.

Industrial Applicability

The position sensors according to the present invention has the following advantages.

(1) The temperature properties can be improved with no use of an extra cw it dedicated for the temperature compensation.

(2) The output indicating a displacement to be need can be improved in the linearity.

(3) As the coil of which the inductance is comparatively low is applied with a pulse form of voltage, its eddy current can favorably be utilized due to the high frequency component of the voltage. As the result, the coil can be minimized in the size. The position sensor is allowed to employ logic devices and can thus be implemented by IC technique. It is however necessary in the prior art to feed the coil of which the inductance is low with a sine wave form of the voltage which has as a high frequency as 200 kHz to 500 kHz. Accordingly, the prior art has to be redundantly equipped with a high-end operational amplifier.

What is claimed is:

1. A position sensor comprising:

a coil;

one selected from: an electric conductor and a magnetic member, each having an area overlapping at least a part of the coil, with the coil and the selected electric conductor or magnetic member being arranged together so that a size of the overlapping area varies as a position of an object whose position is being determined changes;

a resistor connected in series with and constituting a series circuit together with the coil, such that the resistor has a resistance value greater than zero so that a period of oscillation of the circuit is minimized;

a capacitor arranged to be alternatively charged and discharged through the series circuit of the coil and the resistor; and an inverse output comparator for receiving a charging voltage of the capacitor as an input; for conducting charging of the capacitor when an output is at a high level, and for conducting discharging of the capacitor when the output is at a low level;

such that a displacement of the object being examined is detected as a change in period of a continuous oscillation motion;

wherein a resistance of the coil a resistance of the resistor, a capacitance of the capacitor, and a threshold voltage of the comparator are determined so a change in period is minimum when at least one of the resistance of the coil, the resistance of the resistor, the capacitance of the capacitor, and the threshold voltage of the comparator is varied, and when a temperature is at a predetermined level.

2. A position sensor comprising:

a coil;

one selected form: an electric conductor and a magnetic member each having a area overlapping a least a part of the coil, whit the coil and the selected electric conductor or magnetic member being arrange together so that a size of the overlapping area varies as a position of an object whose position is being determined changes;

a resistor connected in series with and constituting a series circuit together with the coil, such that the resistor has a resistance value greater than zero so that a period of oscillation of the circuit is minimized;

a capacitor arranged to be alternatively charged and discharged through the series circuit of the coil and the resistor;

an inverse output comparator for receiving a charging voltage of the capacitor as an input; and a timing circuit for uniformly restricting a period of a continuous oscillating motion, such that a displacement of the object whose position is being determined is detected as a change in time duration which extends from a leading end of the period to a time when an output of the comparator returns to a high level as timed substantially at a trailing end of the period.

3. The position sensor according to claim 2, wherein the resistance of the coil, the resistance of the resistor, the capacitance of the capacitor, and the threshold voltage of the comparator are determined so that a change in the time duration remains minimum when at least one of the resistance of the coil, the resistance of the resistor, the capacitance of the capacitor, and the threshold voltage of the comparator is varied, and when a temperature is at a predetermined level.

4. The position sensor according to any of claims 1 to 3, wherein the threshold voltage of the comparator exhibits hysteresis.

5. A position sensor comprising:

a coil;

one selected from; an electric conductor and a magnetic member each having an area overlapping at least a part of the coil, with the coil and the selected electric conductor or magnetic member being arranged together so that a size of the overlapping area varies as a position of an object to whose position is being determined changes;

a resistor connected in series with and constituting a series circuit together with the coil, such that the resistor has a resistance value greater than zero so that a period of oscillation of the circuit is minimized;

a capacitor arranged to be alternatively charged and discharged through the series circuit of the coil and the resistor; and an inverse output comparator for receiving a charging voltage of the capacitor as an input, and having a threshold voltage that exhibits hysteresis; and a timing circuit for uniformly restricting a period of a continuous oscillating motion;

such that a displacement of the object whose position is being determined is detected as a change in the one of: a time duration for charging the capacitor and a time duration for discharging the capacitor.

6. The position sensor according to any of claims 1 to 3 and 5, wherein the object whose position is being determined is accompanied with one of the coil and the selected one of the electric conductor and the magnetic member, such that the size of an overlapping area of the coil at one of an outer and an inner side of the coil and the selected one of the electric conductor and the magnetic member, varies as the object moves linearly.

7. The position sensor according to any of claims 1 to 3 and 5, wherein the object whose position is being determined is accompanied with the one of the coil, and the selected one of the electric conductor, and the magnetic member, such that a size of an overlapping area of both outer and inner sides of the coil varies as the object moves linearly.

8. The position sensor according to any of claims 1 to 3 and 5, wherein the object whose position is to be determined is a rotary shaft on which one of an electric conductor and a magnetic member, having a gradually radially diverging disc shape, is mounted; and a coil is located such that a size of an overlapping area of the coil and the selected one of the electric conductor and the magnetic member varies as the rotary shaft rotates.

9. The position sensor according to any of claims 1 to 3 and 5, wherein the object whose position is being determined is a rotary shaft on which one of an electric conductor and a magnetic member, having a gradually radially diverging disc shape, is mounted; and a pair of coils is positioned such that a coil is on either side of the gradually radially diverging disc such that a size of an overlapping area of the coils and the selected one of the electric conductor and the magnetic member varies as the rotary shaft rotates.

10. The position sensor according to any of claims 1 to 3 and 5, wherein the object whose position is being determined is a rotary shaft on which a pair of one of electric conductors and magnetic members, having a gradually radially diverging disc shape, are mounted at a distance from and in phase with each other; and a coil is positioned between the paired selected electric conductors or magnetic members, such that a size of an overlapping area of the coil and the selected pair of electric conductors or magnetic members varies as the rotary shaft rotates.

11. The position sensor according to any of claims 1 to 3 and 5, wherein the object whose position is being determined is a rotary shaft on which one of an electric conductor and a magnetic member having a gradually radially diverging disc shape, which shape is symmetrically about a center point, is mounted; and a pair of coils is symmetrically positioned about the center point such that a size of an overlapping area of the coils and the selected one of the electric conductor and the magnetic member varies as the rotary shaft rotates.

12. The position sensor according to any of claims 1 to 3 and 5, wherein the object whose position is being determined is a rotary shaft on which one of an electric conductor and a magnetic member having a gradually radially diverging disc shape, symmetrical about a center point, is mounted; and two pairs of coils are symmetrically positioned about the center point with the disc between each pair, such that a size of an overlapping area of the coils and the selected one of the electric conductor and the magnetic member varies as the rotary shaft rotates.

13. The position sensor according to any of claims 1 to 3 and 5, wherein the object whose position is being determined is a rotary shaft on which a pair of one of electric conductors and magnetic members having a gradually radially diverging disc shape, symmetrical about a center point area, are mounted at a distance from and in phase with each other; and a pair of coils is positioned between the paired selected electric conductors or magnetic members, such that a size of an overlapping area of the coils and the selected pair of electric conductors or magnetic members varies as the rotary shaft rotates.

14. The position sensor according to any of claims 1 to 3 and 5, wherein the coil has a magnetic core at the center thereof.

* * * * *